United States Patent [19]

Lentz et al.

[11] Patent Number: 5,572,444
[45] Date of Patent: * Nov. 5, 1996

[54] METHOD AND APPARATUS FOR AUTOMATIC PERFORMANCE EVALUATION OF ELECTRONIC DISPLAY DEVICES

[75] Inventors: Louis F. Lentz, Beaver Creek; Michael W. Shellhause, Vandalia; John H. Harshbarger, Jr., Xenia, all of Ohio

[73] Assignee: MTL Systems, Inc., Dayton, Ohio

[ * ] Notice: The portion of the term of this patent subsequent to Sep. 27, 2011, has been disclaimed.

[21] Appl. No.: 287,539

[22] Filed: Aug. 8, 1994

Related U.S. Application Data

[63] Continuation-in-part of Ser. No. 932,364, Aug. 19, 1992, Pat. No. 5,351,201.

[51] Int. Cl.[6] .................................................. G01R 31/00
[52] U.S. Cl. ...................... 364/551.01; 348/181; 382/141
[58] Field of Search ....................... 364/551.01; 348/181, 348/222; 235/462, 471; 382/10, 12, 17, 58, 59, 65

[56] References Cited

U.S. PATENT DOCUMENTS

| | | | |
|---|---|---|---|
| 4,303,938 | 12/1981 | Berke | 358/139 |
| 4,408,337 | 10/1983 | Pham Vancang | 377/44 |
| 4,415,921 | 11/1983 | Mulvnny | 358/139 |
| 4,415,927 | 11/1983 | Penney | 385/139 |
| 4,485,394 | 11/1984 | Ghaem-Maghami | 358/10 |
| 4,495,519 | 1/1985 | Wahlquist | 358/139 |
| 4,513,318 | 4/1985 | Wilensky | 358/10 |
| 4,635,096 | 1/1987 | Morgan | 358/10 |
| 4,666,014 | 8/1984 | Wilensky | 358/10 |
| 4,670,782 | 6/1987 | Harshbarger | 358/139 |
| 4,752,825 | 6/1988 | Buckley | 358/139 |
| 4,870,357 | 9/1989 | Young et al. | 324/158 |
| 4,894,718 | 1/1990 | Hung | 358/139 |
| 4,897,721 | 1/1990 | Young | 358/139 |
| 4,974,080 | 11/1990 | Fritchie | 358/139 |
| 4,975,846 | 12/1990 | Abe | 364/424 |
| 4,999,703 | 3/1991 | Henderson | 358/60 |
| 5,003,393 | 3/1991 | Riegel | 358/160 |
| 5,041,980 | 8/1991 | Maddock | 364/431 |
| 5,051,816 | 9/1991 | Harrison | 358/10 |
| 5,051,918 | 9/1991 | Parsons | 364/494 |
| 5,055,928 | 10/1991 | Klingelhofer | 358/139 |
| 5,062,055 | 10/1991 | Chinnaswamy | 364/513 |
| 5,166,791 | 11/1992 | Crawford | 358/139 |

OTHER PUBLICATIONS

Photo Research, Product Bulletin No. 800–1, 1991.

Primary Examiner—Emanuel T. Voeltz
Assistant Examiner—Thomas Peeso
Attorney, Agent, or Firm—Baker & Daniels

[57] ABSTRACT

A method and apparatus for evaluating the degradation of a video display device. Single parameter test signals and patterns, generated either internally or externally to the video device, are displayed on the screen. A sensing device such as a CCD camera reads the screen and transmits the data to a processing unit. Codes, imbedded in the test signal or pattern, indicate to the testing device what test is currently being run, the content of the test, and/or the specific setup situation. The code may be inherent in the pattern, the sequencing, or in addition thereto. The processing unit reads and interprets the results in accordance with the received test codes. The apparatus includes a portable, hand-held unit capable of detecting video degradation on a pass/fail basis. The unit is separate from the display under test and is capable of identifying and evaluating the test through the receipt and interpretation of the embedded codes in the test patterns, and evaluating performance on a go/no-go basis.

13 Claims, 28 Drawing Sheets

Microfiche Appendix Included
(24 Microfiche, 1 Pages)

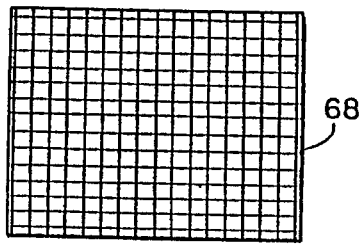
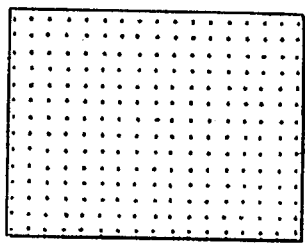
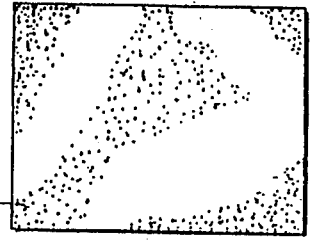
FIG. 4A  FIG. 4B  FIG. 4C
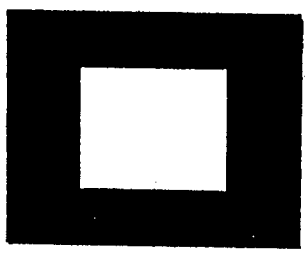
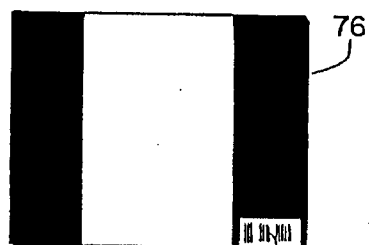
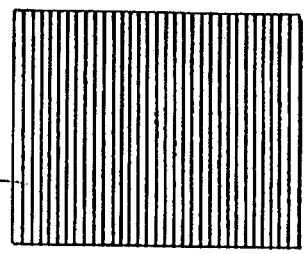
FIG. 4D  FIG. 4E  FIG. 4F
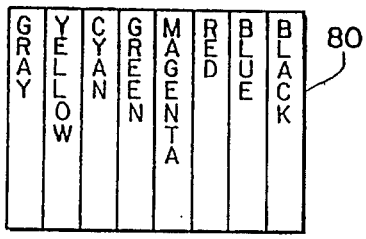
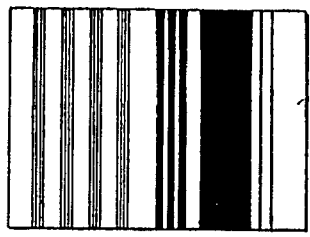
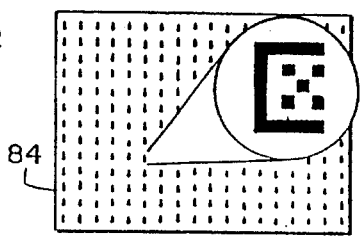
FIG. 4G  FIG. 4H  FIG. 4I
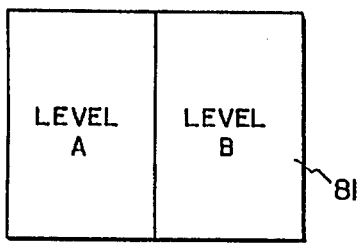
FIG. 4J

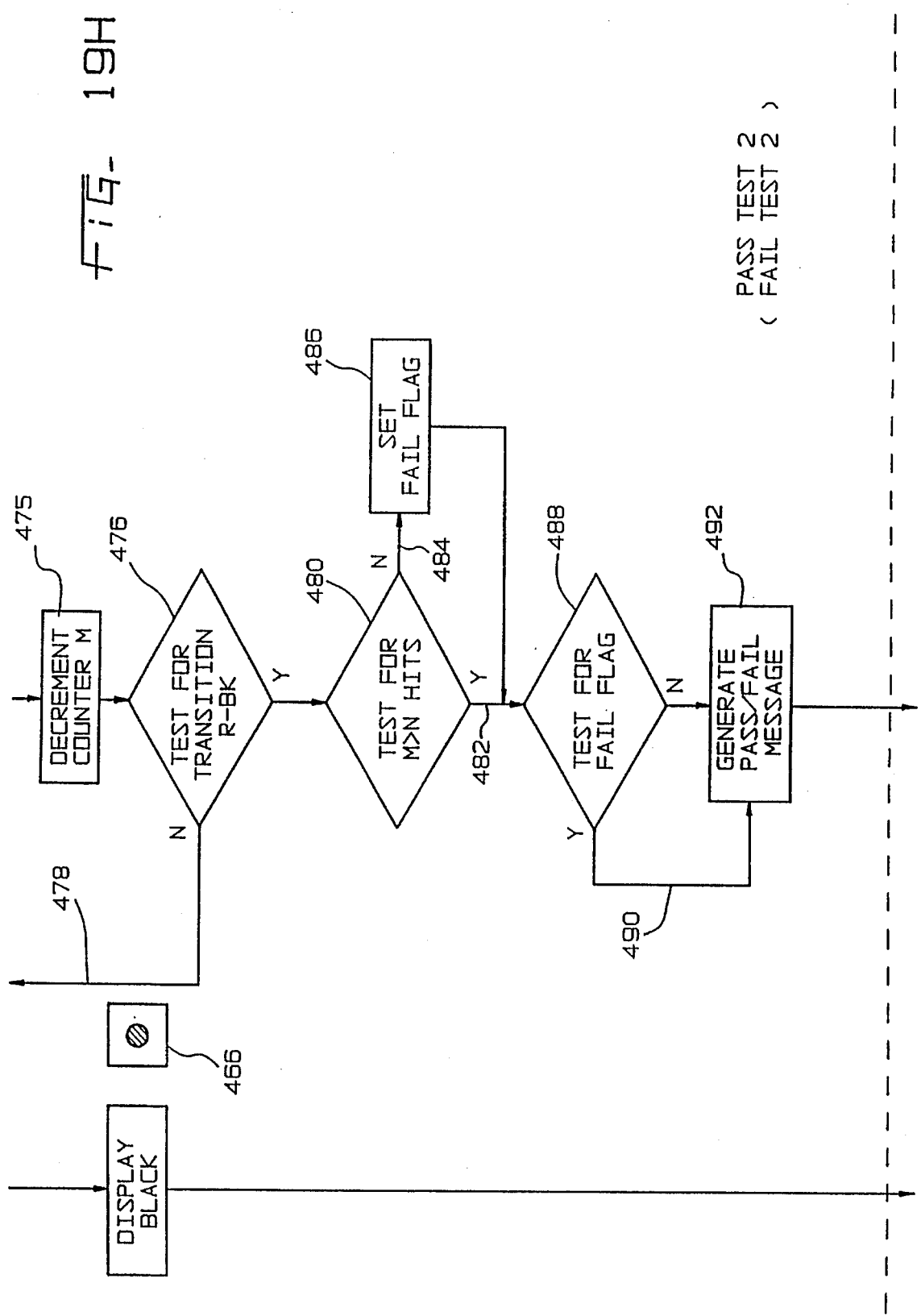

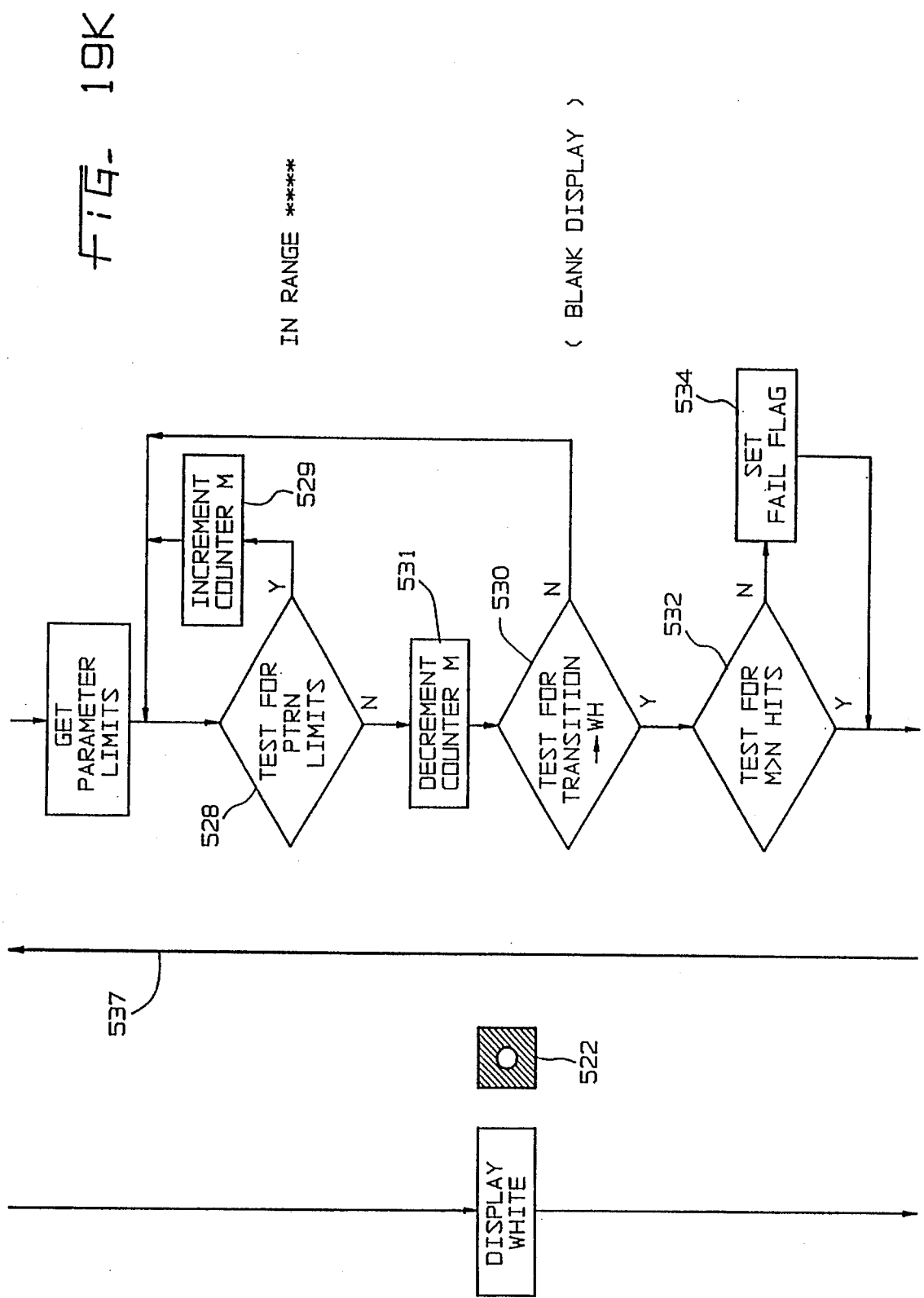

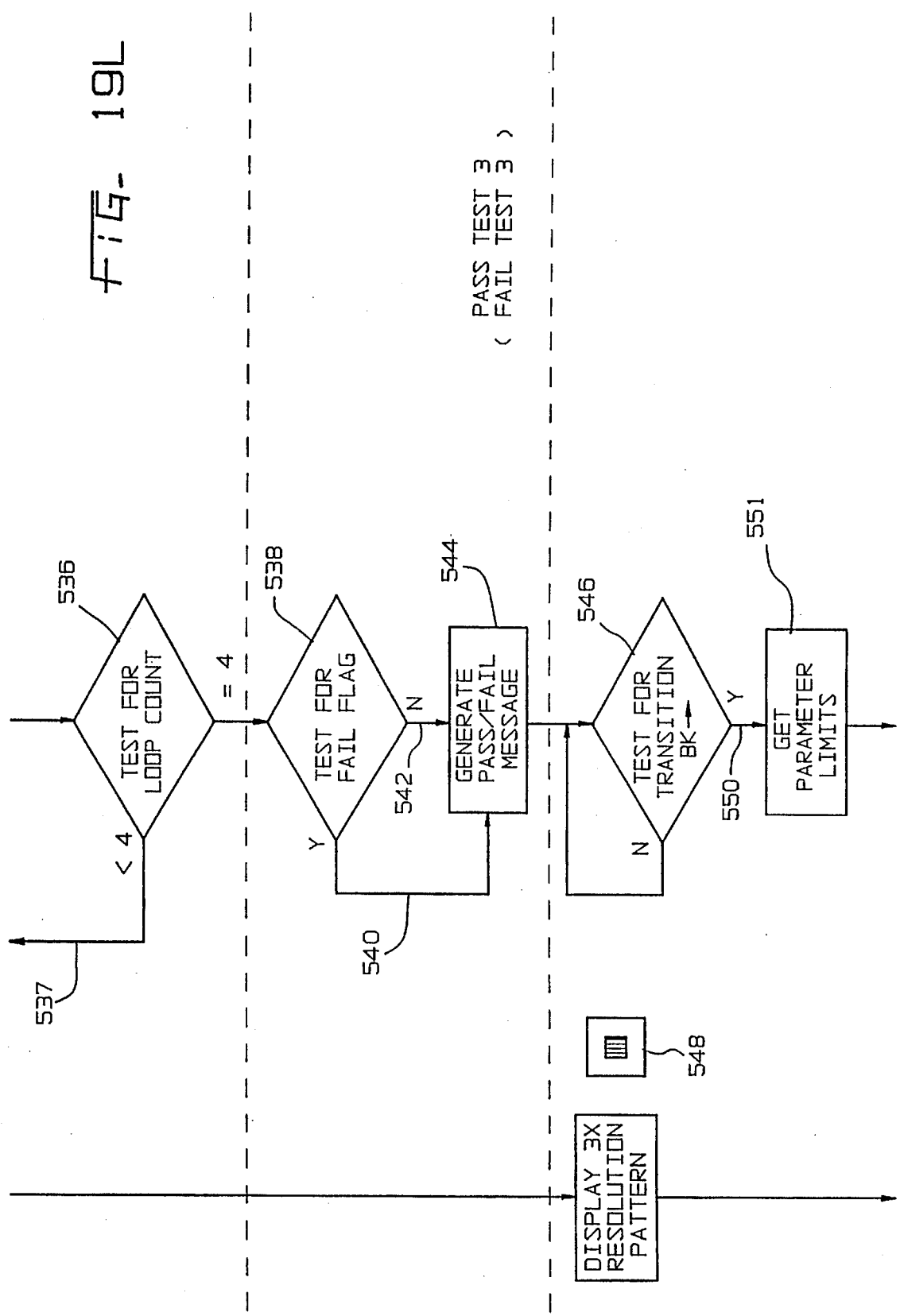

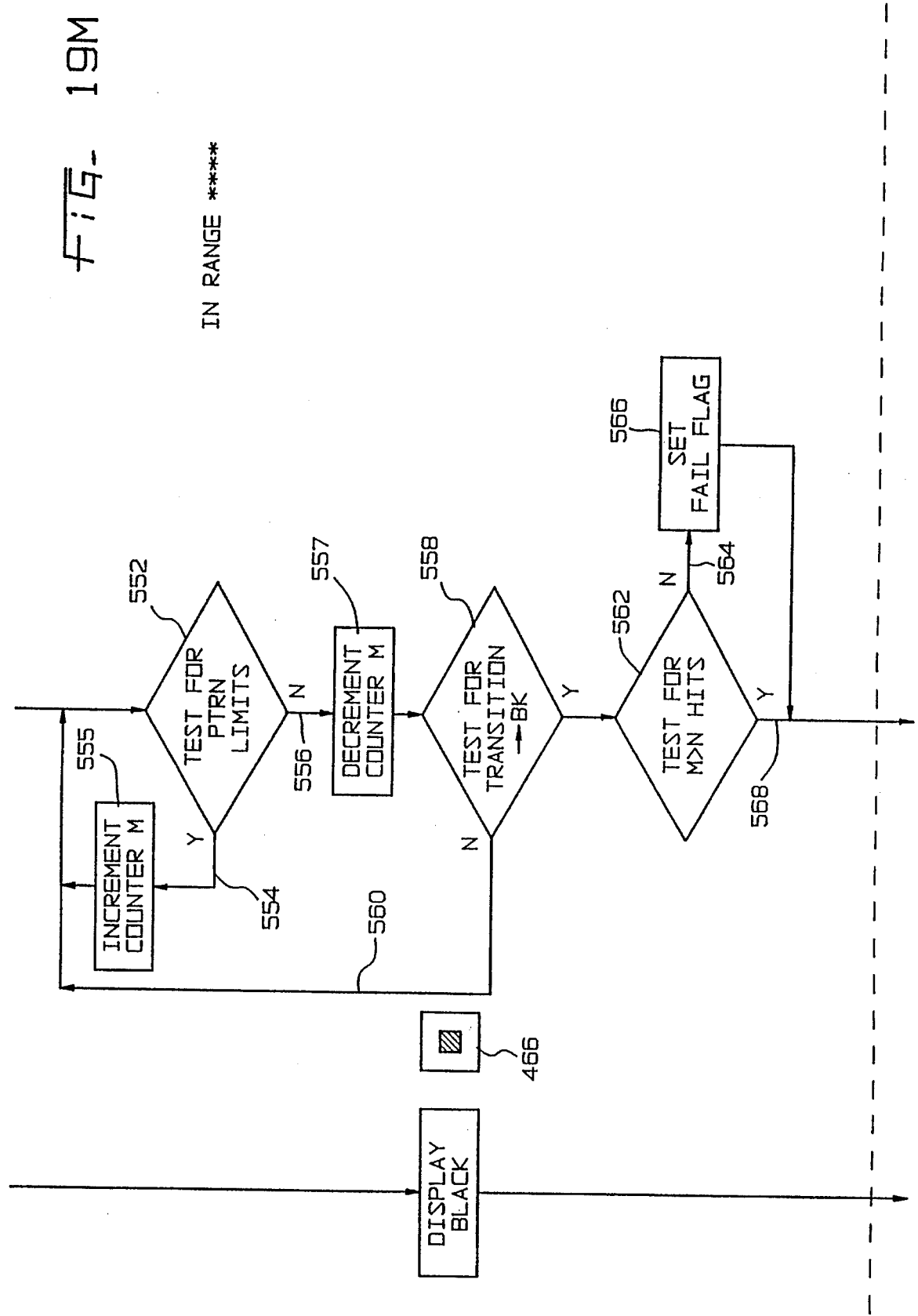

METHOD AND APPARATUS FOR AUTOMATIC PERFORMANCE EVALUATION OF ELECTRONIC DISPLAY DEVICES

GOVERNMENT RIGHTS IN PATENT

The invention described herein was made with proceeds from Government Contract No. F33615-91-C-3603. Pursuant to the contract, the government may have certain rights in this patent and its technical data.

CROSS-REFERENCE TO RELATED APPLICATIONS

This is a continuation-in-part of U.S. patent application Ser. No. 07/932,364, filed Aug. 19, 1992 now U.S. Pat. No. 5,351,201 allowed Mar. 22, 1994, which is expressly incorporated herein by reference.

MICROFICHE APPENDIX

This application includes a microfiche appendix having 24 frames, 1 page.

BACKGROUND OF THE INVENTION

1. Field of the Invention

The present invention relates to performance evaluation of electronic devices and, more particularly, to degradation evaluation of electronic display devices.

2. Description of the Related Art

Electronic devices whether audio or video are commonplace. They are utilized in a myriad of applications within many fields of technology. Video applications range from TV, video games, and computers, to the display of data for monitoring various occurrences or events within many, varied environments, e.g. machining, robotics, aircraft instrument display, computer simulation and analysis, nuclear power plant monitoring and regulation, and the like. Audio applications range from telecommunications and transmission links, to recorders and the like.

In the later exemplary uses described above, electronic displays convey visual information and data to the observer such as current or operating conditions, various stages of warning conditions, results, etc. It is upon this information and data that the observer must make decisions regarding the monitored environment. Often, these devices display critical event and condition data which must be conveyed to the observer for immediate consideration, possibly resulting in a consequential action taking place. In the case of many video devices, color plays an important role in conveying the visual information to the observer. It is therefore important that the information presented to the observer through the video device be readable. Thus, visibility becomes an important consideration in the application of electronic displays.

One such critical event display is in the application of video display devices in airplane cockpits. Whether the airplane is commercial, private, or government, video displays are utilized to provide current, real-time data which must be seen and comprehended by the pilot.

Eventually, all electronic devices undergo a deterioration of performance over their effective lifetime. The rate and degree of deterioration or degradation of performance of the device is influenced by many factors. Generally though, with human senses, it is difficult to determine up to the actual point of failure, whether or not the performance of an electronic device has degraded and to what degree.

The evaluation of the performance characteristics of electronic displays for determining display degradation is essential for assuring adequate and accurate conveyance of the visual information, especially in critical environment applications.

Thus, because of the need for receiving intelligible information via video display devices, the video display devices utilized for conveyance of such information must be tested periodically for performance degradation.

It has been known to test signal transmission by use of test signals in order to appraise the quality of signal transmission. Results were analyzed using specialized equipment such as a waveform monitor (oscilloscope) and, for NTSC encoded color, the vectorscope. Although this type of testing indicated performance deterioration or degradation of the transmitting equipment, it did not indicate whether the receiving video device was functioning properly or not.

Manufacturers, video repair establishments, and end users performed tests on the video devices in order to appraise the performance thereof. Such testing was conducted utilizing various patterns, created to reveal possible problems. Analysis was performed by visual inspection and with some limited photometric and colormetric equipment.

Because of the history of the development of video display devices, Cathode Ray Tubes (CRT's) have generally been the target of performance testing. CRT testing has traditionally focused on problems such as convergence of the red, green, and blue primaries in a color CRT. Convergence, the precise alignment of the red, green, and blue electron beams in a shadow mask tube, is evaluated by the position of the separate red, green, and blue dots or pixels to significant accuracy by use of CCD sensor arrays to inspect a small area at a time. Such systems are very complex and do not address all of the characteristics of a CRT which can degrade and affect performance. Further, such performance testing systems are not applicable to video display devices such as LCD, plasma, fluorescent, LED, or other non-CRT display technology.

Automated testing of video display devices has traditionally been to devise a method to automatically decipher information contained within traditional and complex test signals and patterns. These test signal and patterns may be, for example, gray Scale, Multiburst, Encoded Color Bar, and Sin-Squared combinations and patterns such as the EIA Resolution Test Chart, and the SMPTE Test Pattern per RP-133. These signals and patterns are constituted in a rather complex manner with a multiplicity of test stimuli in order to make transmission of the test information most efficient and to make visual observation and evaluation as speedy as possible.

Generally, pattern generators are utilized to create the relatively complex images for the automatic testing. However, the prior art automatic video testing systems require a closed-loop system wherein the sensor, which interprets what is shown on the display under test, must be separately informed of the display content, and the test being performed. Thus, the display stimulus must be of a proper, predetermined content and the processor interpreting sensor signals must be separately informed as described above. Also, most prior art systems do not consider specific setup situations, or the type or content of the test being performed. Further, prior art automatic video testing systems often utilize human intervention and evaluation of test stimuli.

Because of the shortcomings of the prior art, it is desired to have automated testing of all types of electronic video displays, which is without human subjectivity, and is an open loop system.

SUMMARY OF THE INVENTION

The present invention overcomes the shortcomings of the prior art by providing a fully automated, open-loop video performance degradation evaluation test method and apparatus which can quickly, accurately, and easily test all types of electronic display devices.

In one form thereof, the present invention provides a method of automatically testing and evaluating the performance of electronic audio and video devices utilizing an embedded code to indicate to a sensing and processing unit the type of test being run.

In one form thereof, the present invention provides a method for automatically evaluating the performance of an electronic audio/video device. The method comprises the steps of generating test stimuli and imputing to the stimuli to the audio/video device for outputting by the audio/video device, and providing a sensor coupled to an output of the audio/video device. A code is embedded within the test stimuli which is detectible by the sensor, the code indicative of test parameters, while the outputted test stimuli and code is detected and data representative thereof is outputted. By means of a processor coupled to the sensor the data representative of the outputted test stimuli and the code is received and analyzed in accordance with the code to evaluate performance degradation of the audio/video device wherein an indication of performance degradation is provided.

The present invention is advantageous over the prior art in that a set procedure is used for automatically testing the electronic display device. The data from the set procedure is analyzed electronically thereby eliminating human subjectivity.

Another advantage of the present invention is the greatly increased test speed at which the device under test may be evaluated.

In one form thereof, the present invention provides an apparatus for automatically evaluating the performance of an electronic video display device. The apparatus comprises means for generating predetermined test stimuli, coupled to the video device, for display on the video display, the test stimuli including an embedded code indicative of current test parameters. Means for detecting the test stimuli in the code from the video display, and means, comparable to the detecting means, for analyzing and evaluating the test stimuli according to the code, is also provided.

The present invention is advantageous over the prior art through greater flexibility in the test procedure as programmed for all of the various electronic display devices which can be tested.

It is an advantage of the present invention in its ability for either, or both, a go/no go or quantitative test procedures.

In one form thereof, the present invention provides an apparatus for the automatic performance evaluation of an electronic video display device, the apparatus comprising a camera for receiving visual information emanating from the video display and outputting data representative of the received information. A pattern generator is coupled to the video display for producing a sequence of single parameter test patterns for display on the video display. Means for embedding a code within the single parameters test pattern indicative of the type of test being conducted is provided, along with a processor, coupled to the camera. The processor receives the data representative of the outputted test pattern and the code and analyzes the data in accordance with the code to evaluate performance degradation of the video device and provides an indication of performance degradation thereof.

An advantage of the present invention over the prior art is the ability for it to be used by one with no technical capability or training.

It is an object of the present invention to provide a quick pass/no pass test for automatically evaluating the performance of an electronic video display device.

It is another object of the present invention to provide an apparatus for automatically evaluating the degradation of an electronic video display device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 4A–J are representations of sample test patterns utilizable by the present invention;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
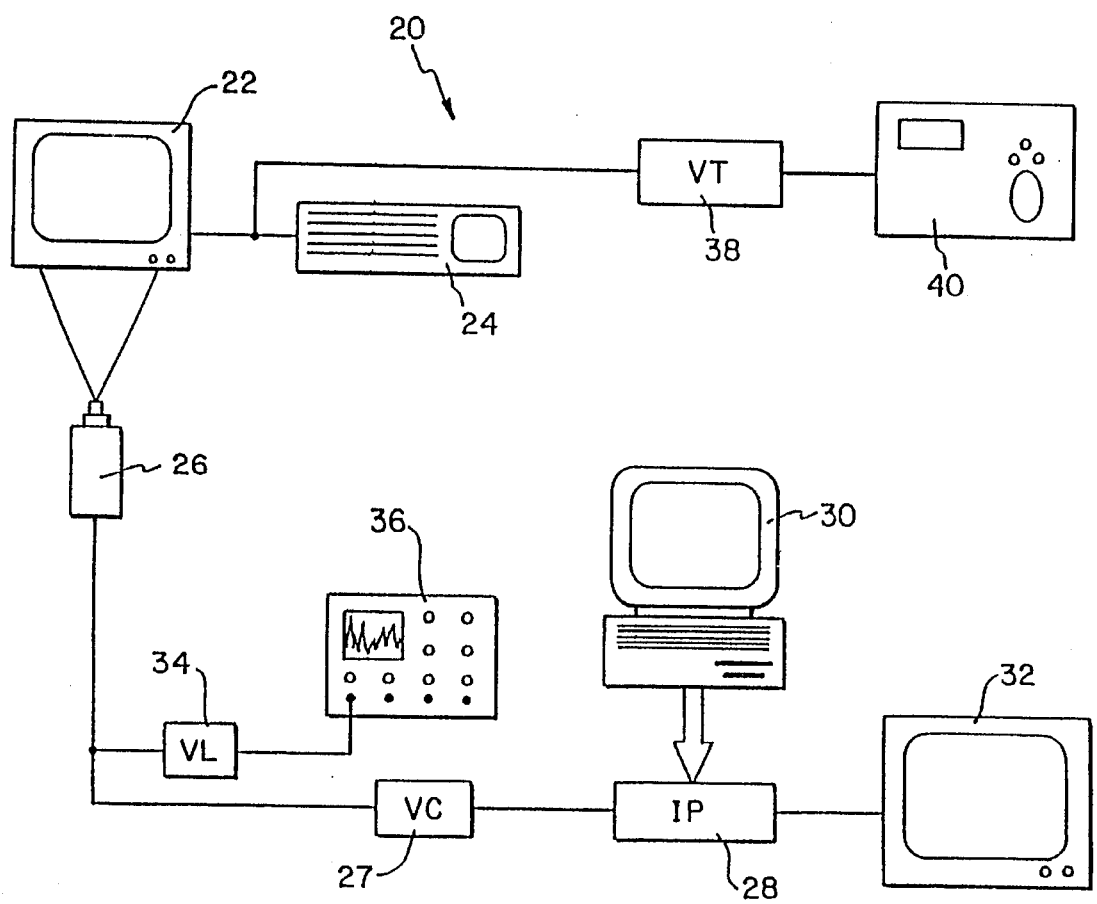
FIG. 1 is a schematic of an embodiment of the present invention.

In order to evaluate the performance of an electronic display device, a knowledge of the degradation parameters in electronic display devices is essential. Within the context of CRT's, eleven parameters subject to degradation are readily identified as follows.

1. Brightness is the intensity of light emitted from the display surface, and is fundamental to interpretation of any type of display data. Degradation of this parameter in the display device will affect whether or not the information of interest can be visually detected by the observer.
2. Contrast is the ratio of the light emitted in light areas versus dark areas of the display. Degradation will impact the ability to discriminate among the various information presented to the observer. It should be noted that brightness and contrast are integrally important to visual acuity.
3. Black level is the threshold at which light is emitted from the display surface sufficiently to just be visible. Black level is a component of contrast, with similar implications regarding degradation.
4. Color fidelity is the generation of the desired color on the display surface, and includes uniformity, fringing, registration, convergence, and all other color related matters. Degradation will deter recognizability of information where color is the discriminator among the visual information.
5. Uniformity is the consistency of brightness generated from various areas on the display surface. Degradation in this area can render the information recognizable in some portion of the display, but not so in other portions.
6. Size is the stability of height and width of the image area. Extreme degradation will result in misinterpretation of apparent range where size is important in the conveyance of the information.
7. Centering is the stability of position of the image area on the display surface. Degradation will cause edge information to suffer distortion or be lost altogether.
8. Geometry is the proportioning of the displayed image, including linearity and other distortions. Degradation can result in confusion among similar information.
9. Lag is the time required for build-up or decay of a change in brightness. Degradation of this parameter may result in flicker (lag too short) or image smearing (lag too long), either of which impede the ability to recognize the information.
10. Focus is the setting of CRT operating conditions for maximum sharpness of the image on the display surface. Degradation results in nonrecognition or misinterpretation of the information.
11. Resolution is the ability of the display to exhibit fine detail information. Degradation of resolution results in loss of image clarity.

Other types of electronic display devices such as liquid crystal (LC), fluorescent, LED, etc. because of their inherent characteristics, do not have the same degradation parameters as CRTs. This is because their structure creates a fixed display area, with light emitted from individual cells on the display area. Therefore, certain parameters such as Size, Centering, Geometry, and Focus are not an issue regarding degradation. However, other parameters specific to these types of display devices are suspected to contribute to degradation. These four parameters are as follows.

1. Image Storage or Retention is essentially the same effect as Lag in CRTs and various light sensing devices. Image retention is known to decrease image contrast ratio in any change of scene.
2. Directivity is the change in display brightness or contrast as the viewing angle varies, and is a component of Brightness and Contrast.
3. Background Light is the background illumination required to create the image in a transmissive device such as a liquid crystal display. As the background illumination is a function of the light source, it may degrade with time and temperature.
4. Light Scatter is the scattering of light among individual image elements (or pixels) due to the discrete nature of the elements, as opposed to the continuous surface of a CRT. This is a contributor to the Brightness and Contrast parameters.

Thus, the parameters subject to degradation in flat-panel displays are a subset of those for CRTs, while certain characteristics peculiar to flat-panel displays produce contributions to the CRT parameters. The ability then, to assess the degradation parameters of a CRT will also satisfy the requirements for flat-panel of other type displays.

Referring to FIG. 1, there is shown an embodiment of an electronic/video display degradation evaluation apparatus (EDDEA) 20 according to one embodiment of the present invention. The video display under test is represented at 22. At the outset, it should be noted that display 22 may be any kind of electronic video display device, e.g. CRT, LED, LCD, fluorescent, plasma, or the like. Coupled to display 22 is a programmable test pattern generator 24. Programmable test pattern generator 24 provides the test patterns or stimuli to be displayed on display 22. A Vii® Model 2701C or Model 2800 Programmable RGB Color Video Pattern Generator with EEPROM or floppy disk data storage was utilized, however, it should be recognized that any type of test pattern generator having the desired characteristics may be utilized. Such a pattern generator system is described in U.S. Pat. No. 4,670,782 issued Jun. 2, 1987 to Harshbarger et al. entitled, "Television Video Pattern Generator System," and is specifically incorporated herein by reference. A CCD sensor camera 26 is utilized to view the visual information presented on display 22 through input from pattern generator 24. Camera 26 is a focusing type camera in order to provide position related parameter testing. Camera 26 is capable of producing separate primary color outputs, and provides NTSC encoded color signals. As the image processor system requires an RGB format video input, the NTSC output of camera 26 is translated into RGB format by a video converter 27. A TrueVision™ VID I/O converter box was utilized, however, it should be understood that other types of signal conversion may be utilized.

Although a CCD sensor camera providing NTSC encoded color signals is utilized, an RGB or monochrome camera may be used. In the case of an RGB camera, video converter 27 would not be necessary. In the case of a monochrome camera, colored filters for red, green, and blue would be utilized, with the tests performed with the red filter, then the green filter, and then the blue filter. Thus, it should be recognized that the camera type or sensor type is quite flexible.

The output RGB signal from video converter 27 is captured by an image processor board 28 which is coupled to a computer 30. Computer 30 is a 80386-CPU based personal computer with typical specifications as purchased off the shelf. However, any suitable computer which is capable of utilizing an image processor board and handle the capacity may be utilized. Image processor board 28 is configured to capture the video signal from the sensor camera and analyze it in accordance with arbitrary programmed limits of performance. A TrueVision™ AT VISTA Image Processor (frame grabber) board was utilized as image processor 28. Image processor 28 provides digital processing capability and speed to perform real-time calculations of sensor signal content, including acceptance of separate red, green, and blue video primary inputs with the capability to digitize each to 8-bits (256 levels) per input pixel. Computer 30 with image processor 28 processes the incoming information according to the sensed patterns or stimuli displayed on display 22. An additional monitor 32 is coupled to image processor 28 for separately viewing the test patterns and sequences received by camera 26, however, such monitor is optional. As described in more detail hereinbelow, the patterns produced by pattern generator 24 include imbedded codes for identifying to computer 30 the type of test being run, the content of the test, and/or the specific setup situation.

EDDEA 20 is also shown in FIG. 1 to include a video transcoder 38 coupled to pattern generator 24 for receiving the same pattern signal as is received by display under test 22. Video transcoder 38 is a FOR.A Video Transcoder which translates the test patterns and sequences from RGB video to NTSC color video format. Video transcoder 38 is coupled to a video tape recorder 40 which receives the NTSC color video format and records the same for documentation purposes.

EDDEA 20 also includes the capability to monitor the video waveforms emanating from display 22 and received by camera 26. A video linefinder 34 was used to permit selection of any single horizontal scan line in the video frame for input into an oscilloscope 36. Video linefinder 34 is a Vii® Linefinder Model 11, however, any linefinder or similar device may be utilized to accomplish the same or similar function.

Figure 2:
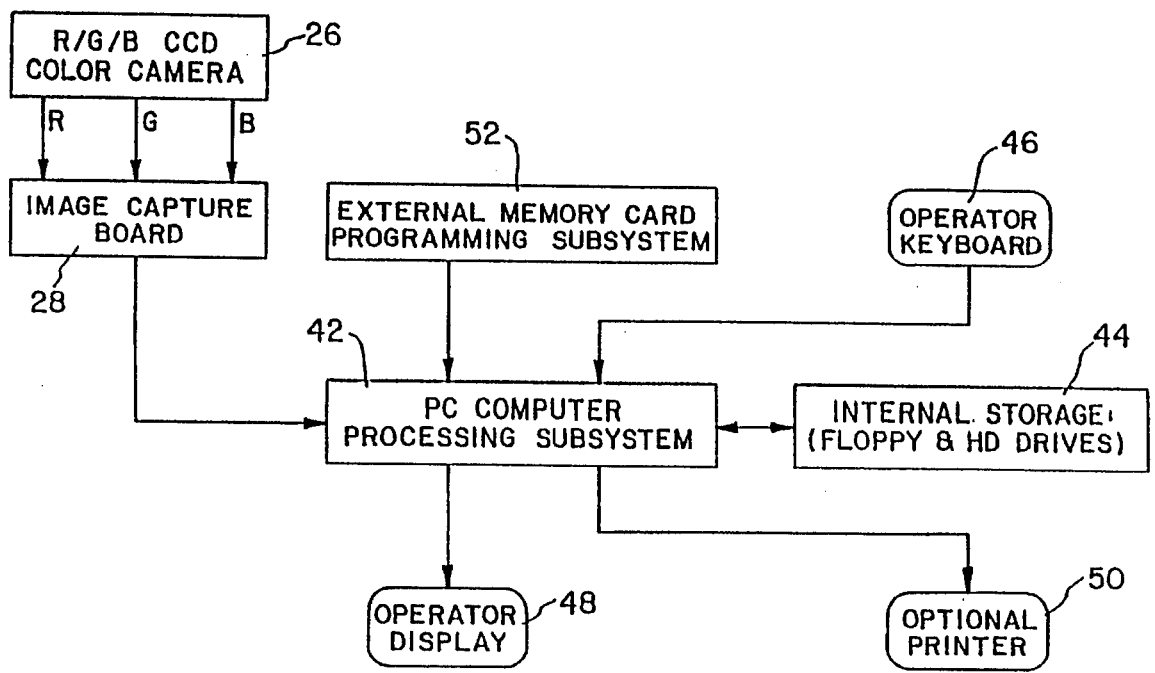
FIG. 2 is a system functional flow chart of the embodiment of FIG. 1.

Referring to FIG. 2, EDDEA 20 functionally consists of three distinct sections. The first of the three functional sections is the Image Recognition section consisting of CCD RGB Color Camera 24 and Image Capture or Frame Grabber Board 28. Camera 26 transforms a viewed image, here a test pattern, into video signal components which are used as inputs to image capture board 28. Image capture board 28 captures and digitizes individual frames of the input signals.

The second of these sections is the PC Processing System (corresponding to image processor 28 and computer 30 of FIG. 1) consisting of PC Computer 42, disk drives 44, keyboard 46, display 48, and printer 50. Printer 50 is optional for producing hard copy outputs of the display evaluation results. Computer 42 evaluates the digitized test pattern information provided by image capture board 28.

The third section is the External Memory Subsystem consisting of external memory card programming subsystem 52. This subsystem can be used to program evaluation reference data or operating range data for use in the embodiment shown in the other figures and described in detail in connection therewith hereinbelow.

This system is thus based on a PC type computer 30 using a video frame-grabber expansion board 28. A highly sensitive and accurate CCD type camera 26 or other equivalent sensing unit capable of producing separate primary color outputs, is used as an input to the frame-grabber board. This system allows very accurate analysis of the output characteristics of display under test. Display test data will be able to be reviewed on the monitor of the test system as well as by printer output or storage.

Figure 3:
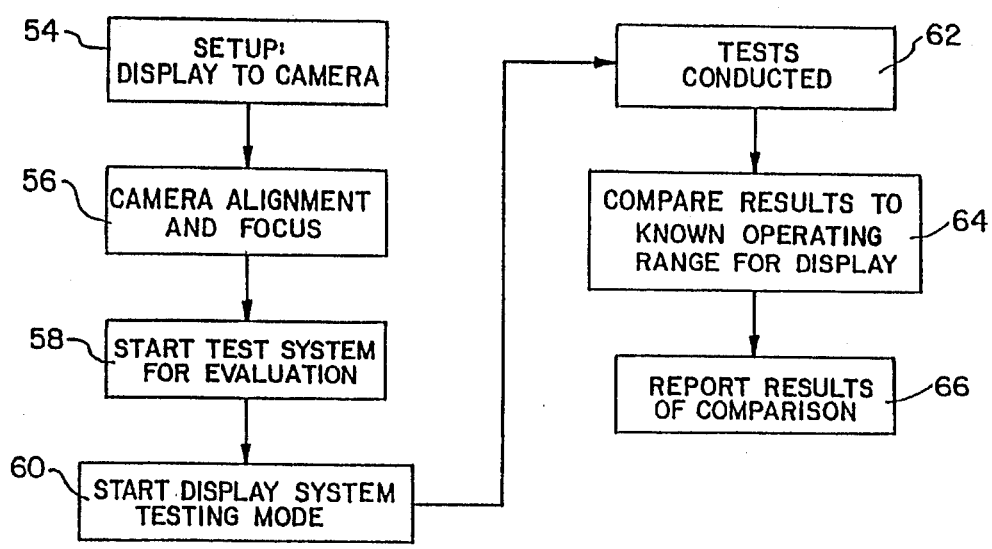
FIG. 3 is a system evaluation flow chart of the process utilized by the embodiment of FIG. 1.

Referring to FIG. 3, the system evaluation process or procedure for the automatic testing of a video display is shown in flow chart form, being particularly applicable to the embodiment of FIG. 1. The first step 54, is to set up the camera-to-display under test interface, accomplished by adjustably mounting camera 26 in relation to display under test 22. This can be accomplished either manually or by an automated computer controlled procedure. The next step 56 is camera alignment and focus. Camera 26 must be correctly aligned with display under test 22 and thereafter be focused thereon for accurate sensing of the visual test patterns or stimuli displayed on display 22. Automated setup may use specially designed test patterns or stimuli for automatic alignment and focus on camera 26. Once camera 26 is correctly aligned and focused in relation to display 22, the test may start indicated by step 58 which is the physical starting of the apparatus.

Step 60 is the start display system testing mode in which display under test 22 is caused to visually output via its screen the test patterns generated by the test pattern generator. According to an aspect of the present invention, an identity code precedes the test patterns in order to indicate to the receiving and processing unit (here camera 26 and computer 30 with frame grabber 28), the type of test to be conducted, and/or the content of the test to be conducted, and/or the specific setup situation. These three items or "unknowns" are required before computer 30 can interpret the received results since computer 30 is not coupled to pattern generator 24. Thus EDDEA 20 is an open loop system wherein the receiving and/or the processing unit recognize the code and can conduct the analysis in accordance with previously installed instructions. The code may also be embedded in one or more of the test patterns, as the test patterns are presented on the display under test. The code may be generated by the pattern generator, if the code is one which is capable of being generated thereby. Other processing features may be used to embed the requisite or desired code depending on the application.

The code can be a start flag, consisting of a known number and sequence of white and black screens shown at intervals of, for example, 1 second. The code would indicate the sequencing of the test stimuli to come and the timing. The code may be at the start of the test patterns or included with the sync pulses. Further, the code can be put in the vertical blanking interval as well as hidden outside the video spectrum.

Sequencing of the test or other patterns is another way to indicate to the sensing device any or all of the three "unknowns" enumerated above. By presenting the test patterns in a certain sequence the receiving and/or processing unit would be able to determine the respective parameters and know how to analyze the incoming stimuli.

Another type of embedded code may be to imbed a bar code 77 (see FIG. 4E) in the test pattern. Bar coding can be integrated into the test pattern to identify which tests are being conducted, as well as to identify the display being evaluated so that the correct operating data can be located for comparison to the obtained test results. This, however, requires that the sensing device, camera 26, must be able to focus and scan the display screen.

There are many possible types of codes which could be embedded into the test patterns or test pattern stimuli, however, it should be recognized that the type of code is limited to that which is readable by the sensor (camera or other device) and interpretable by the processing unit (computer or other device). Thus, the codes described hereinabove are not exhaustive and others known in the art may be used.

Thus the procedure is such that both single parameter or multiple parameter testing may be accomplished. In either case, multiple test patterns and/or intensities, or otherwise, are displayed on display 22 for processing and evaluation for degradation. Performance testing would be conducted by presenting each stimulus in the order required by the particular test sequence or parameter being tested. The stimulus would be activated only for the brief time required for the receiving unit and processor to analyze the information. Thus, a different stimulus could be presented in each video frame, permitting a test rate of 1/60 second per stimulus.

FIGS. 4A–I are representative, only, of the types of test patterns which have been used in prior art testing, and which can be used as single parameter patterns to properly evaluate display performance and can be generated by test pattern generator 24 (FIG. 1). FIG. 4A shows a Bar pattern screen 68; FIG. 4B shows a Dot pattern screen 70; FIG. 4C represents a Flat Field pattern screen 72 (one color or gray scale) which can be of varying intensities for ascertaining brightness and color degradation in the display; FIG. 4D shows a Window pattern screen 74, which can be any combination of colors or gray scales; FIG. 4E shows a V Stripe pattern screen 76, which like the Window pattern of FIG. 4D can be any combination of colors or gray scales; FIG. 4F shows a Resolution pattern screen 78 for testing resolution degradation of the display; FIG. 4G is a Color Bar pattern screen 80, each vertical strip being one color; FIG. 4H shows a Video pattern screen 82; FIG. 4I shows a Character pattern screen 84; while FIG. 4J shows a two level, side by side pattern screen 81, the levels may be color intensity, gray scale, or the like. Each of these patterns test specific performance characteristic components in order to evaluate degradation through simple, single frequency or parameter visual display. The contrast, intensity, or other parameters may be adjusted within successive same parameter test patterns to aid in performance testing.

Step 64 is where the processing unit interprets the results by comparing the received results to known operating range parameters for the specific set up or display. Once the processing unit has determined the degradation state of the display under test, step 66 is the reporting of the results to the operator. Such results can be printed on paper via the printer, or stored in a memory storage device as are commonly known and used with such electronic equipment.

The present invention can be utilized to perform all types of display evaluation including resolution for peak-to-peak response and MTF, black/white vertical split for risetime measurements, and alternating black/white at various rates for lag and image retention analysis. As above, a code would be included in the test pattern or as the sequence of patterns to indicate the type of test to be conducted, and/or the content of the test to be conducted, and/or the specific setup situation. The processing unit, receiving the code would then be able to analyze and evaluate the performance of the display.

The embodiment shown and described hereinabove is utilized to perform production and maintenance calibration of display systems. This system can perform both position and non-position related display parameters electronically and automatically, thereby allowing greater accuracy in determining and diagnosing display degradation problems.

Because of the versatility of EDDEA 20, it is also possible to utilize more complex test patterns so that more detailed testing can be achieved in as little time as necessary. This can be achieved by combining several test patterns into the display area under test. Thus, the patterns of FIGS. 4A–I can be combined in various way to share separate but equal portions of the test area.

Further, the above described system is based upon the assumption that the entire display area is utilized for the visual information. However, there may be instances where the entire electronic display device is not utilized, but instead segmented portions are used. Such devices include flat panel displays, fluorescent, and liquid crystal utilized for specific, dedicated instrumentation, having specific patterns of placement of information, e.g. speedometers, directional compasses. The present invention will perform degradation analysis on these devices once the sensor is properly located, since the parameters remain the same.

Figure 11:
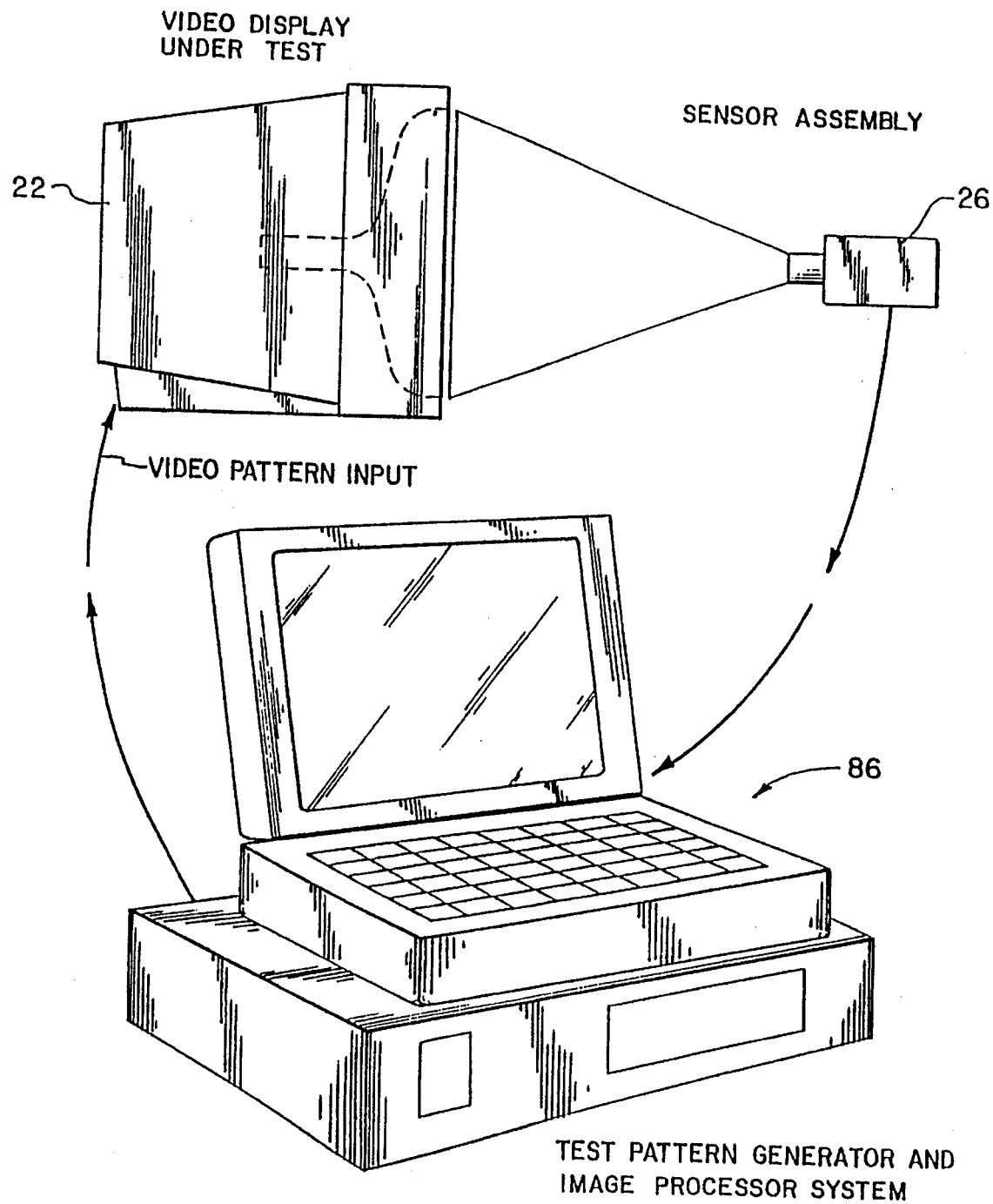
FIG. 11 is a diagrammatic view of another embodiment of the present invention.

FIG. 11 shows another embodiment of the present invention in which an integrated processing unit 86 is coupled to sensor camera 26 and to video display under test 22. Integrated processing unit 86 includes a pattern generator, an image processor, and a computer. Thus, with this embodiment, display under test 22 is coupled to integrated unit 86 with camera 26 aligned and focused on the display screen.

Figure 7:
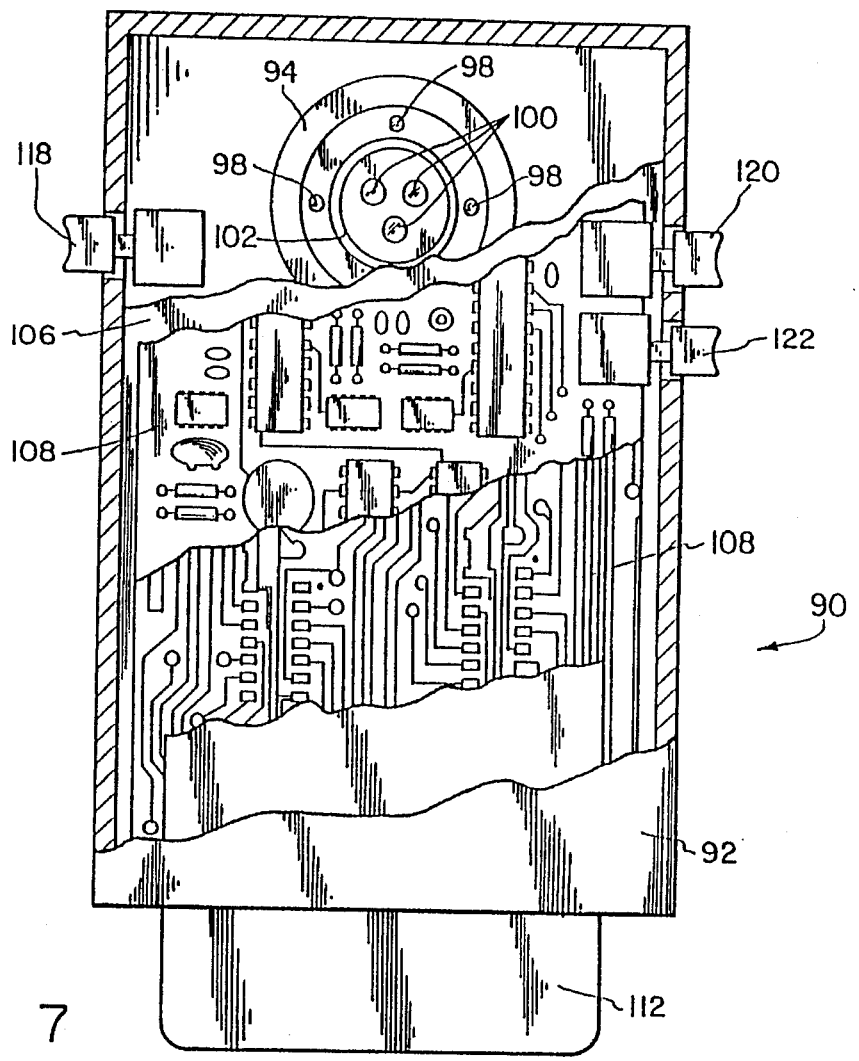
FIG. 7 is a plan view of the embodiment of FIG. 5 in partial cutaway.
Figure 5:
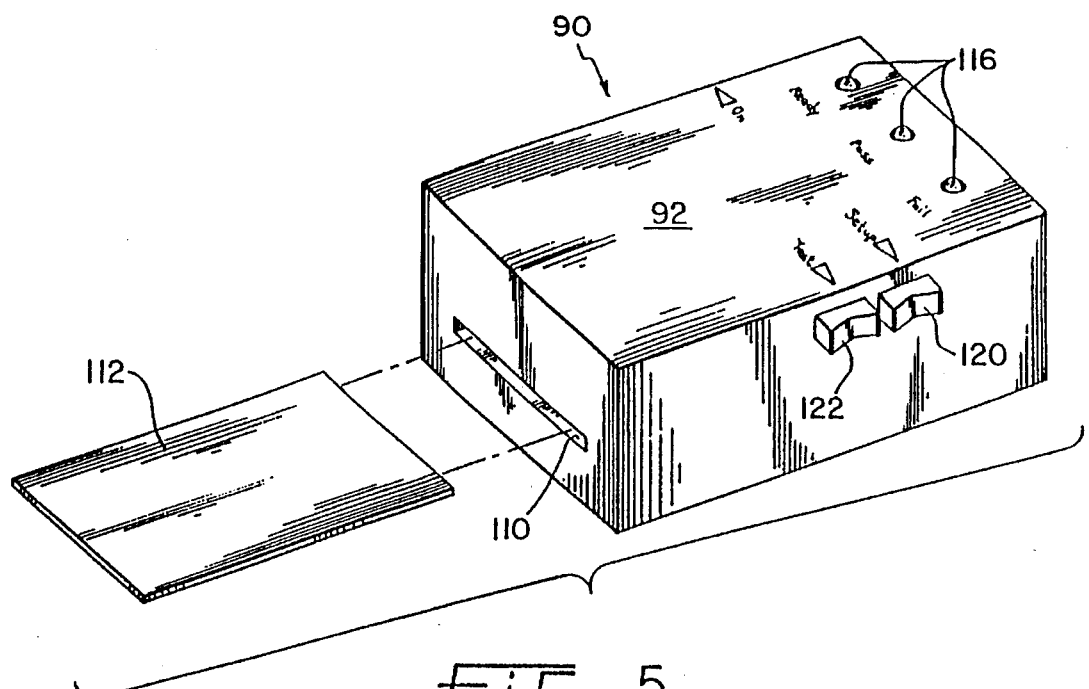
FIG. 5 is a perspective view of another embodiment of the present invention.
Figure 6:
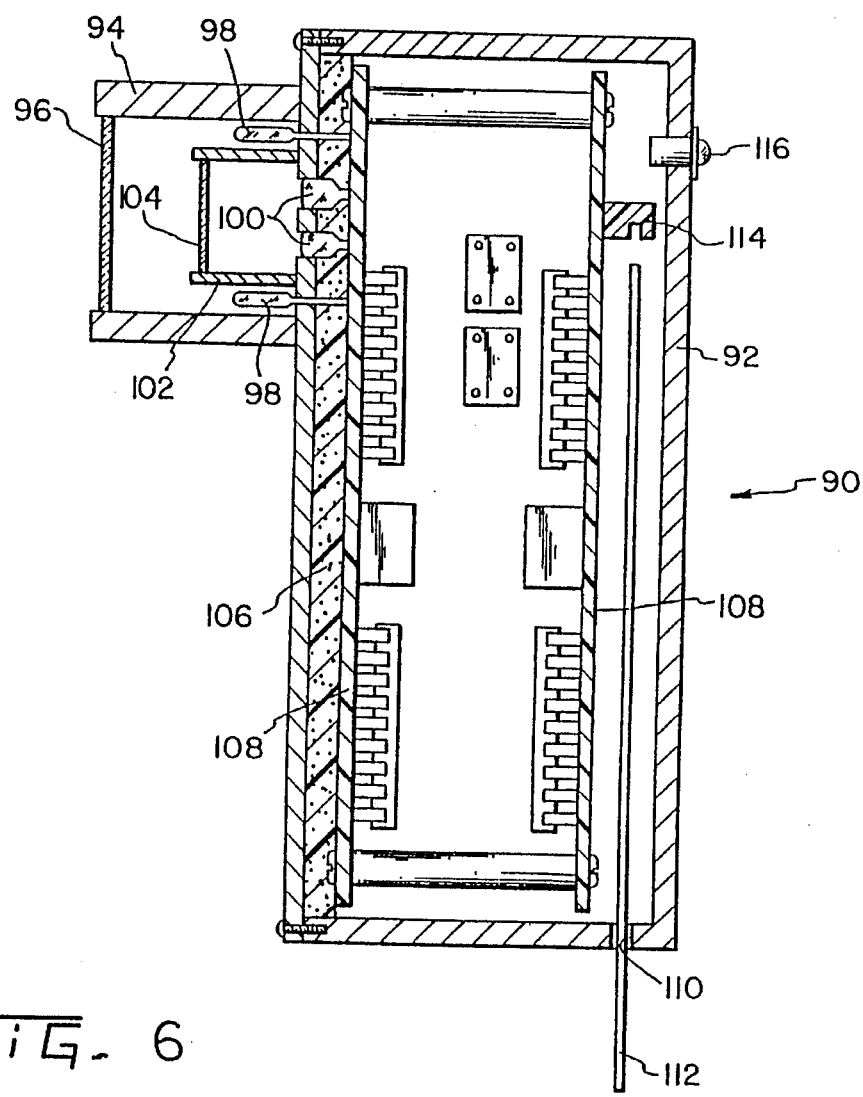
FIG. 6 is a cutaway side view of the embodiment of FIG. 5.

Referring to FIGS. 5–7, there is shown another embodiment of the present invention, specifically, a portable, handheld automatic video degradation evaluation apparatus (AVDEA) 90. AVDEA 90 includes a case or housing 92 with an annular light shield 94 supported thereon. A filter 96 spans the annular aperture defined by light shield 94. Within light shield 94 is a light source 98 for providing a constant indirect illumination for light sensors 100. Light sensors 100 use the indirect illumination in conjunction with the incoming light from the display under test in order to ascertain the visual information of the incoming light. An annular sensor shield 102 surrounds sensors 100 and includes an annular diffuser 104 spanning the annular aperture defined by sensor shield 102.

Within case 92 is a shock mount system 106, here consisting of a foam layer, but which may be any type of shock mounting necessary to insulate the internal components from mishandling or otherwise. Circuit boards 108 are disposed within case 92 and contain the necessary circuitry to read, interpret, analyze, and provide evaluation results of degradation of the video display. Case 92 includes a slot 110 into which is inserted a programmable "smart" card 112 and a card stop/interface 114.

In order for AVDEA 90 to be able to evaluate many types of displays, programmable card 112 is utilized to provide the parameters, test patterns, codes and/or sequences utilized for the particular display under test. Card 112 thus contains the data for comparison to the evaluation results for a particular display. Thus, AVDEA 90, with the insertion of card 112 will be able to evaluate the degradation of the display under test by the information contained in card 112. It should be noted that card 112 is not exclusive, in that EEPROMs or other data storage devices could similarly be used. However, with the myriad of possible display types which can be tested, a card is preferred.

However, AVDEA 90 may not include the capability to accept a smart card. Thus, if a particular type of display is always to be tested for performance degradation, AVDEA 90 may be hardwired to evaluate only that particular display and recognize the proper codes and test patterns. AVDEA 90 may also be built to recognize only a particular test sequence for a particular display.

AVDEA 90 also includes an on/off switch 118, setup switch 120, test start switch 122, and indicator lights 116 in order to turn the unit on, initiate the setup sequence or protocol, start the test, and indicate the results on a pass/fail (go/no go) basis.

Operationally, AVDEA 90 will only be able to evaluate degradation associated with brightness, contrast ratio, gray scale, lag, and color fidelity, which are not position-related parameters. AVDEA 90 is fixed focus, being photometric.

The test pattern sequence must be created upon the display screen of the unit under test. In this embodiment, the testing device, AVDEA 90, is not preferably physically connected to the device under test. Therefore, the test sequence must be included as an option in the display driver, or the display must have an auxiliary video connection to which is connected either a separate test pattern generator, or a test pattern generator within AVDEA 90. If the test pattern generator is included in AVDEA 90, a coupling hookup must also be included for interfacing with the auxiliary video connection of the display device under test.

Figure 8:
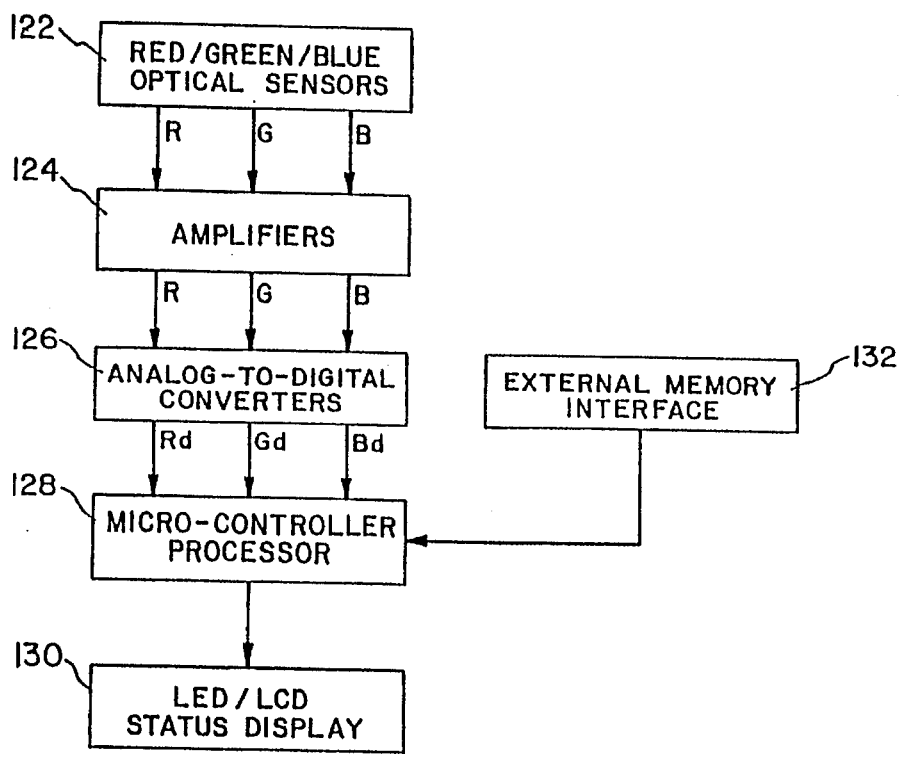
FIG. 8 is a system functional flow chart of the embodiment of FIG. 5.

A functional diagram of the embodiment of FIG. 5–7 is shown in FIG. 8. AVDEA 90 functionally comprising four discrete sections. The first section is the Optical Interface consisting of boxes 122, 124, and 126. Three sensors (physically corresponding to sensors 100 of FIG. 7) to examine the light intensities of the red, green, and blue video components 122 are coupled to separate respective red, green, and blue amplifiers 124 to be within a specific range for correct input to corresponding, separate analog-to-digital (A/D) converters 126. A/D converters 126 transform the analog color component values into digital numbers for input into the second section, the Processor. It should be noted, that in the case where a display to be tested uses different primary color components that the red, green, and blue primaries, special filters for recognition of these color components will be integrated into AVDEA 90.

The Processor section is represented by box 128, and is a micro-processor, which compares the digitized component values to pre-programmed "good" value ranges residing either internally (hard-wired) or through card 112. Card 112 is inserted into section three, the External Memory Interface, represented by box 132. As noted above, card 112 contains the necessary memory to indicate to AVDEA 90 how to interpret and process the test stimuli as identified by the imbedded code.

The fourth section is the Status Display represented by box 130. Status Display may be as simple as indicator lights 116 by using simple LEDs, or may include an LCD display capable of displaying messages or otherwise.

Figure 10:
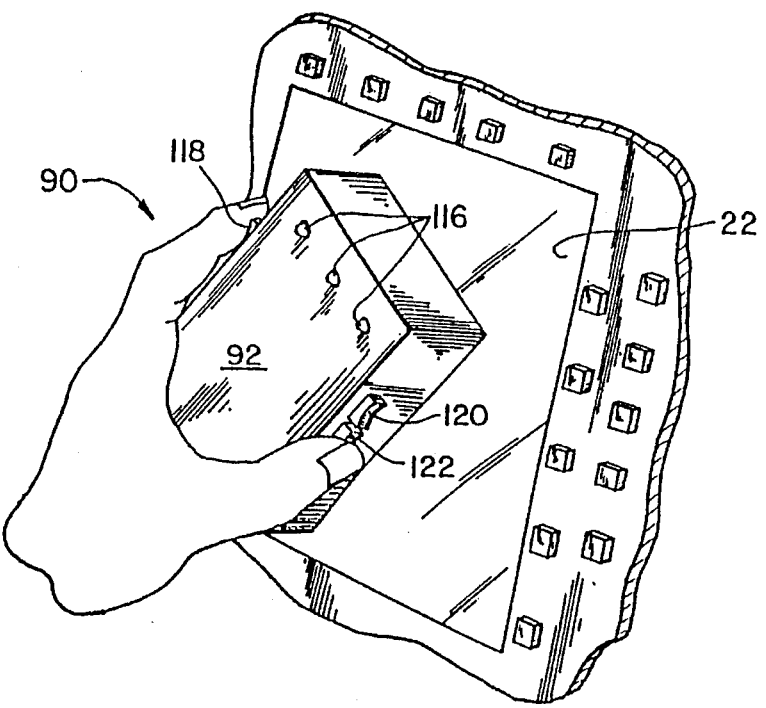
FIG. 10 is a perspective view of the embodiment of FIG. 5 in use.
Figure 9:
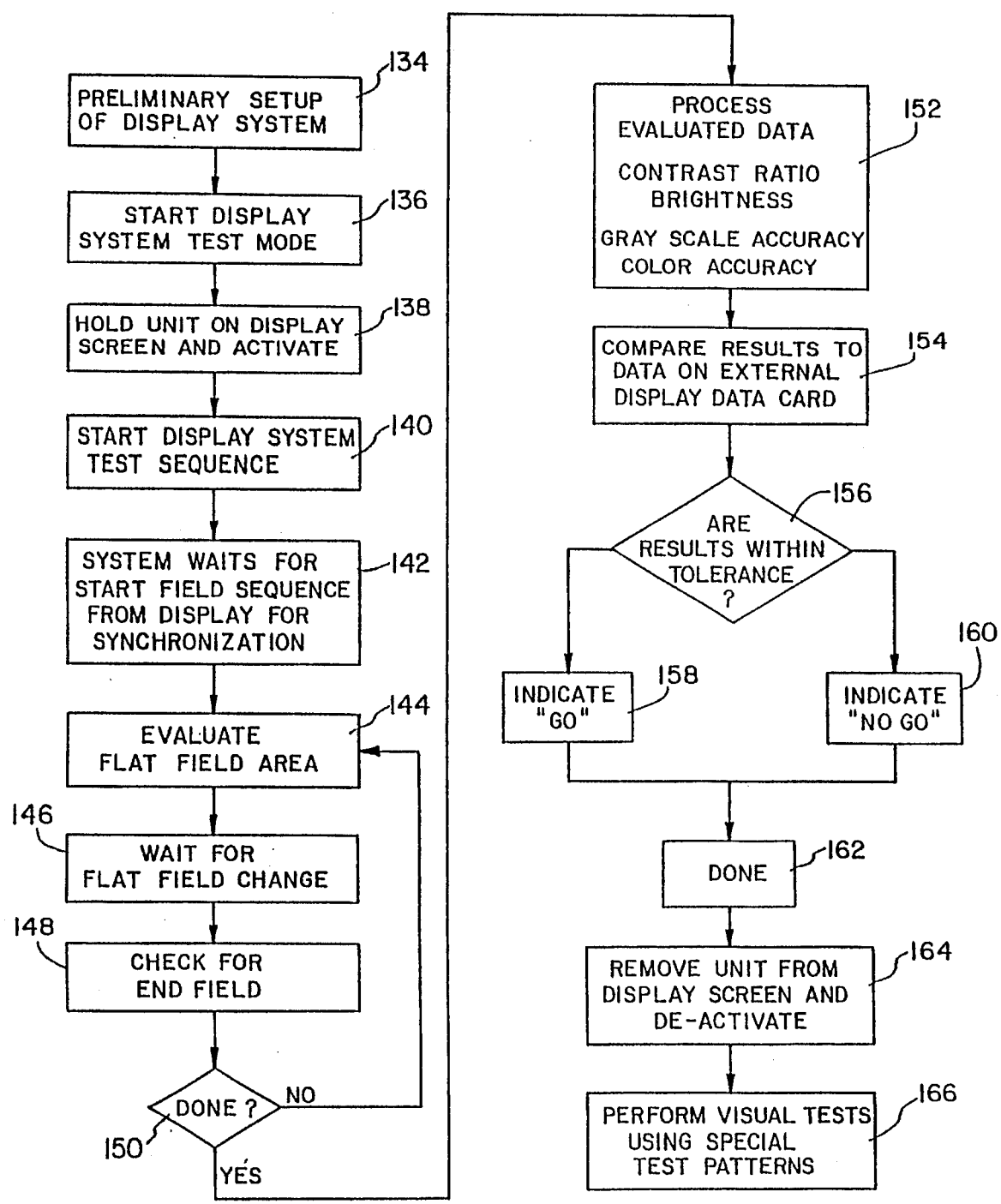
FIG. 9 is a system evaluation flow chart of the process utilized by the embodiment of FIG. 5.

Referring to FIGS. 9 and 10, the system evaluation process for AVDEA 90 will now be described. Preliminary setup of display system 134 is the verification that the display contrast and brightness control, if provided, are set to correct initial values as indicated by the test unit. Start Display System Test Mode 136 may be accomplished by the following exemplary protocol. Display a test pattern with a black level reference patch, then adjust the contrast to a full maximum, and the brightness to a full minimum. This should result in a dark screen. Then adjust the brightness up to a just perceptible screen illumination. Placing AVDEA 90 up to the screen (see FIG. 10) setup button 120 is depressed. While depressing setup button 120, increase brightness until a Ready light 116 comes on. This establishes the brightness which is not readjusted for the duration of the test. Next a test pattern with a white level patch is displayed. Hold AVDEA 90 up to the screen and depress setup button 120, while decreasing the contrast until the ready light 116 comes on. This establishes white level to specification. The contrast is not readjusted for the duration of the test.

AVDEA 90 is then held onto the display, 138, and activated by depressing test button 122. At this point the test stimuli and code test system sequence is started at which time AVDEA 90 waits for the start field sequence, the code, from the display for synchronization 142. The test sequence is of flat field test patterns. This sequence not only provides the correct test levels for the display evaluation but also controls the synchronization of AVDEA 90 testing. AVDEA 90 evaluates each flat field area 144, then waits for a field change 146 and checks for the end 148. If more test patterns are displayed, the process 144, 146, and 148 is repeated. If all of the flat field test pattern sequences have been shown, 150, then AVDEA 90 evaluates the data 152 for the contrast ratio, brightness, gray scale accuracy, and color accuracy. These results are compared 154 to the parameter data contained either internally (hard-wired) or through the data contained on memory card 112. The results are then checked to see if they are within tolerance 156. Depending on the results, either a "go" 158 or "no go" 160 is indicated by lights 116 and the process is completed 162. AVDEA 90 is removed from the screen 164 at which time visual tests may then performed 166 if desired.

AVDEA 90 is battery-powered, and because of its size, is easily usable in cramped quarters. Operationally, AVDEA 90 will detect intensity levels from a series of flat field test patterns (e.g., FIGS. 4C, 4D), allowing it to evaluate degradation associated with brightness, contrast ratio gray scale, lag, and color fidelity, and any other non-position related parameters. The series of flat field test patterns, like those utilized in EDDEA 20 are very simple, and utilize a sequence of flat fields of various brightness levels as an identity tag (code) to instruct the simple instrument as to the tests being performed. The various brightness levels also are used as the testing stimuli in addition to the identity tag (code).

The microfiche appendix to U.S. patent application Ser. No. 07/932,364 includes computer programs written in the "C" language, although any programming language may be used, which allows processor 86 to interpret and analyze the test stimuli displayed on display 22. FIGS. 14–18 are flow charts for the computer programs set forth in the microfiche appendix.

Figure 12:
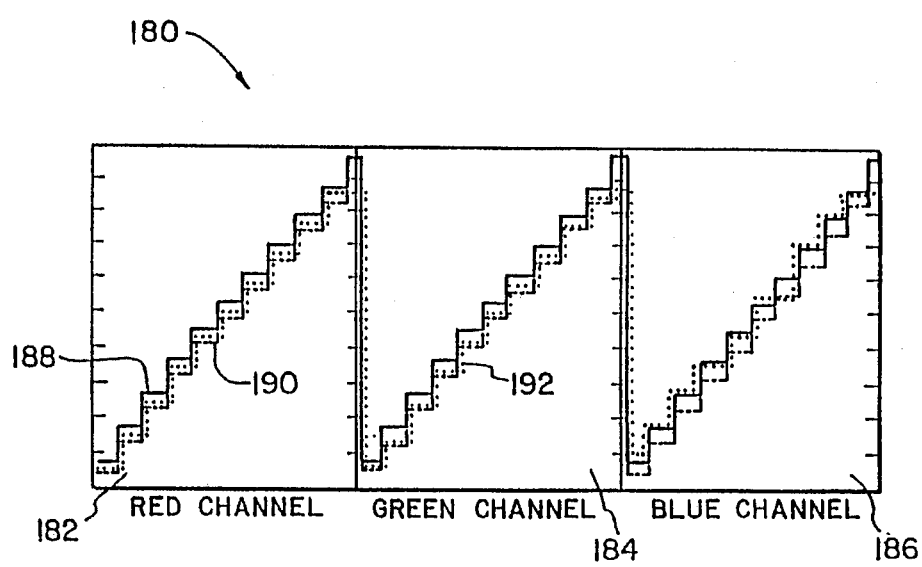
FIG. 12 is a representation of a display of the results of a gray scale test in accordance with the present invention.
Figure 13:
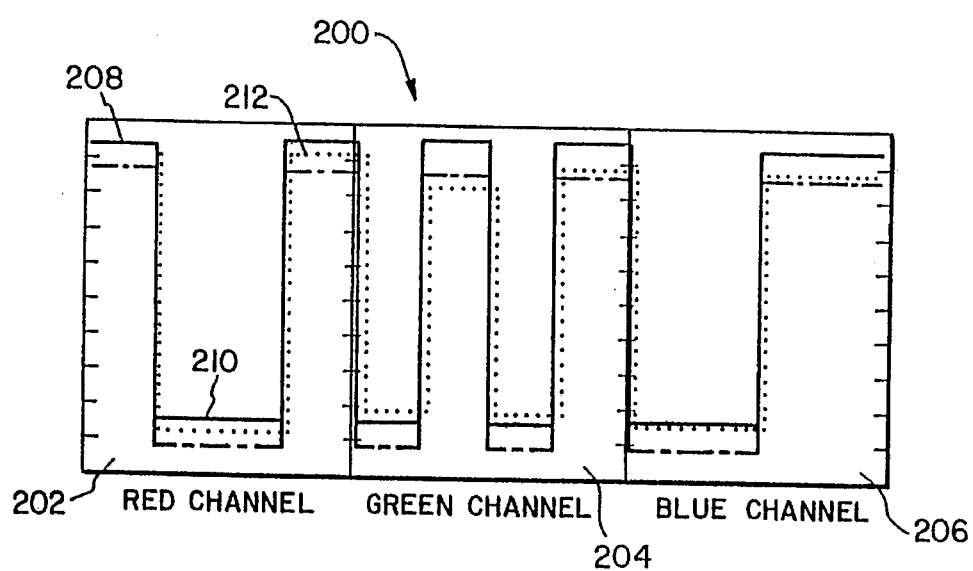
FIG. 13 is a representation of a display of the results of a color bar test in accordance with the present invention.
Figure 14:
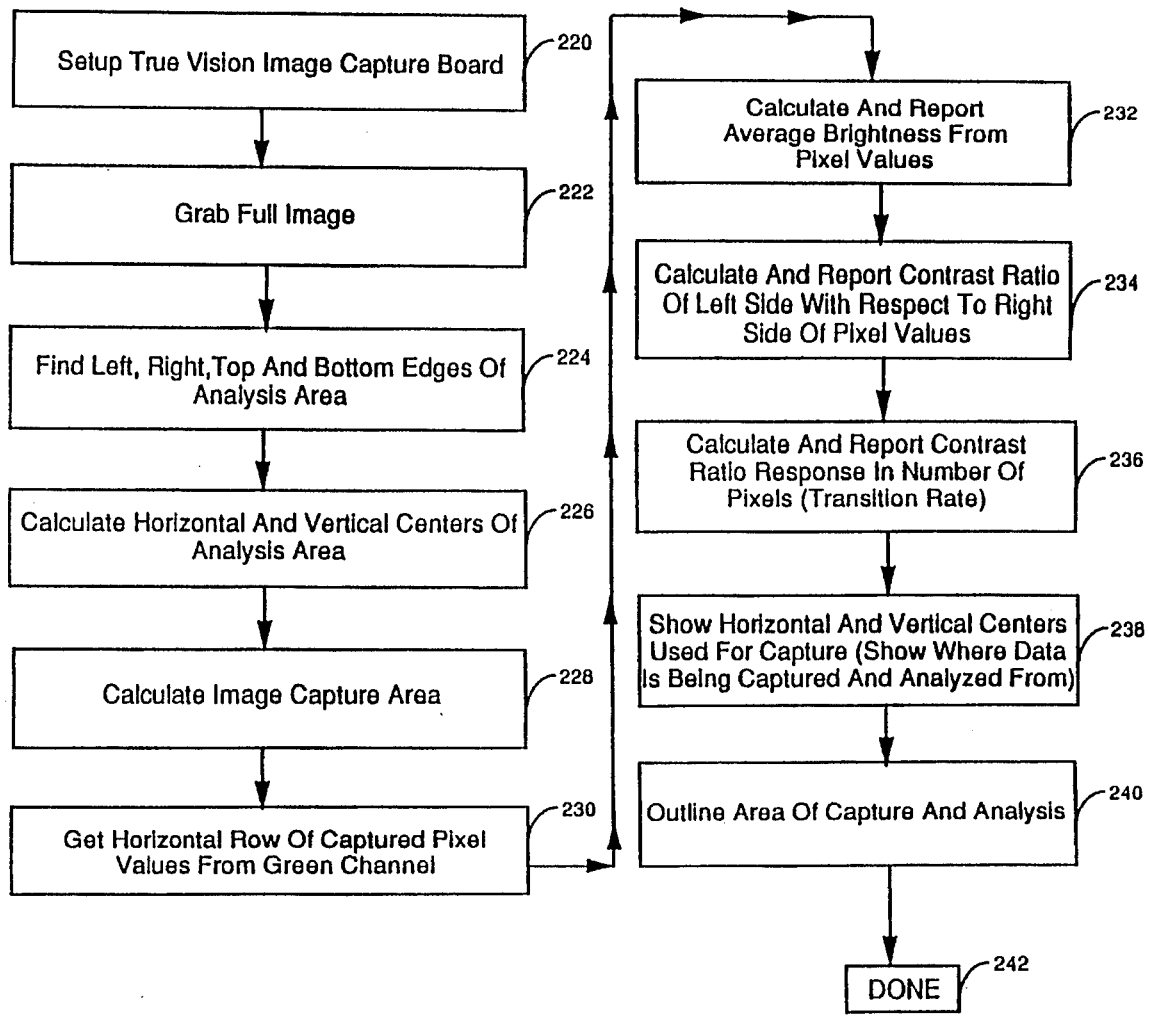
FIG. 14 is a flow chart of a video test procedure.

Referring to FIG. 14, there is shown a flow chart for computer program FGBTEST1.C for testing brightness, contrast ratio, and contrast ratio response. FGBTEST1.C takes a sampling across the center of the pattern such as FIG. 4J screen 81, to evaluate data between left and right edge borders. Level A and level B can be any combination of colors and intensities of colors, gray scales, or other in which brightness, contrast ratio, and contrast ratio response may be evaluated. FGBTEST1.C. is thus a map manipulation routine in order for the processor to perform analysis of the video display, once the pattern and code have been displayed on the video display. The program sets up the image capture board 220 which then grabs the image 222, likened to a digital photograph. The left, right, top and bottom edges of the analysis area 224 are found with the subsequent calculation of the horizontal and vertical centers of the analysis area 226, and the image capture area 228. The horizontal row of captured pixel values from the green, red, or blue channel 230 are obtained depending on which channel it is desired to calculate, which can be a single channel or several channels or all channels sequentially. The average brightness from the pixel values is calculated and reported 232 either on a display screen such as depicted in FIGS. 12 and 13 or in a printout. Further, the contrast ratio of the left side With respect to the right side of pixel values is calculated and reported in the 234 in the same manner as step 232. Further, the contrast ratio response in number of pixels (transition rate) is calculated and reported 236 in the same manner, while the horizontal and vertical centers used for the capture area 238 is shown with an outline of capture area and analysis 240. Analysis results may be as shown in FIGS. 12 and 13. Once the test has completed, the process is done 242.

Figure 15:
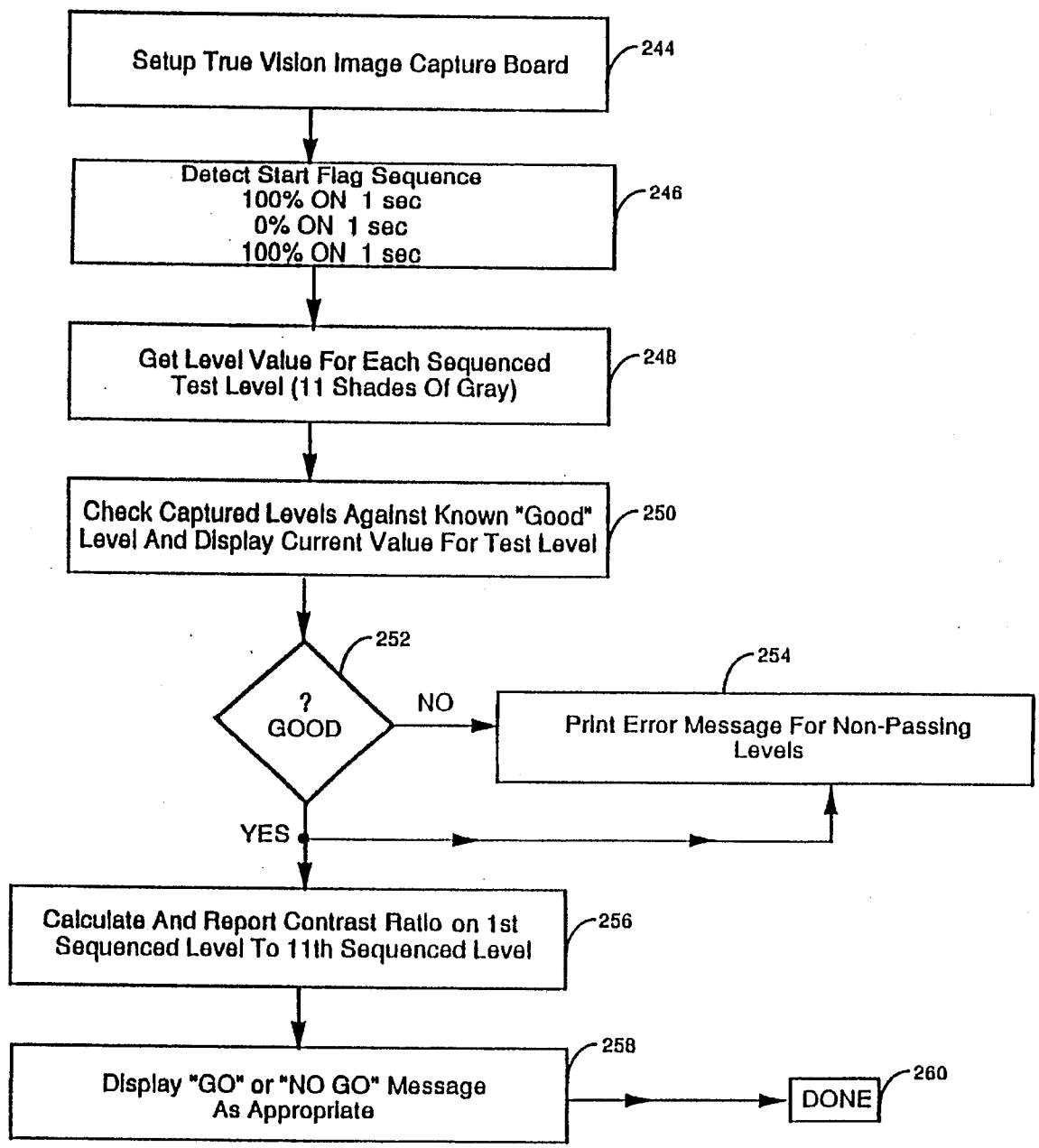
FIG. 15 is a flow chart of a gray scale sequence test procedure.

Referring to FIG. 15, there is shown a flow chart for the computer programs FGBTEST2.C and FGBTEST2C.C which provides a gray scale sequence test and camera set up. Initially, the image capture board is set up 244, while the start flag sequence is detected 246. The start flag sequence, in this case, is the code which indicates to the processor that the gray scale sequence test is to start. Such code in this instance is a 100 per cent on for one second, a zero per cent on for one second, and a 100 per cent on for one second. As described hereinabove, such code may be any of the various types and combinations of stimuli. Next, the level values for each sequenced test level, here eleven shades of gray 248, are captured by the image capture board. Once these levels have been captured, they are checked against known good levels and displayed accordingly 250. In this processing program, the processor will decide whether the captured levels are "good" 252 against the known good levels and accepted tolerances for the particular display under test. If NO is encountered the system prints an error message for non-passing levels 254, however, if YES is indicated, then the contrast ratio from the first sequenced level to the eleventh sequenced level is calculated and reported 256 either in a form such as FIGS. 12 or 13 or on a printout. A "go" or "no go" message may be displayed as appropriate 258 at which time the performance evaluation according to the gray scale sequence test is complete 260.

Figure 16:
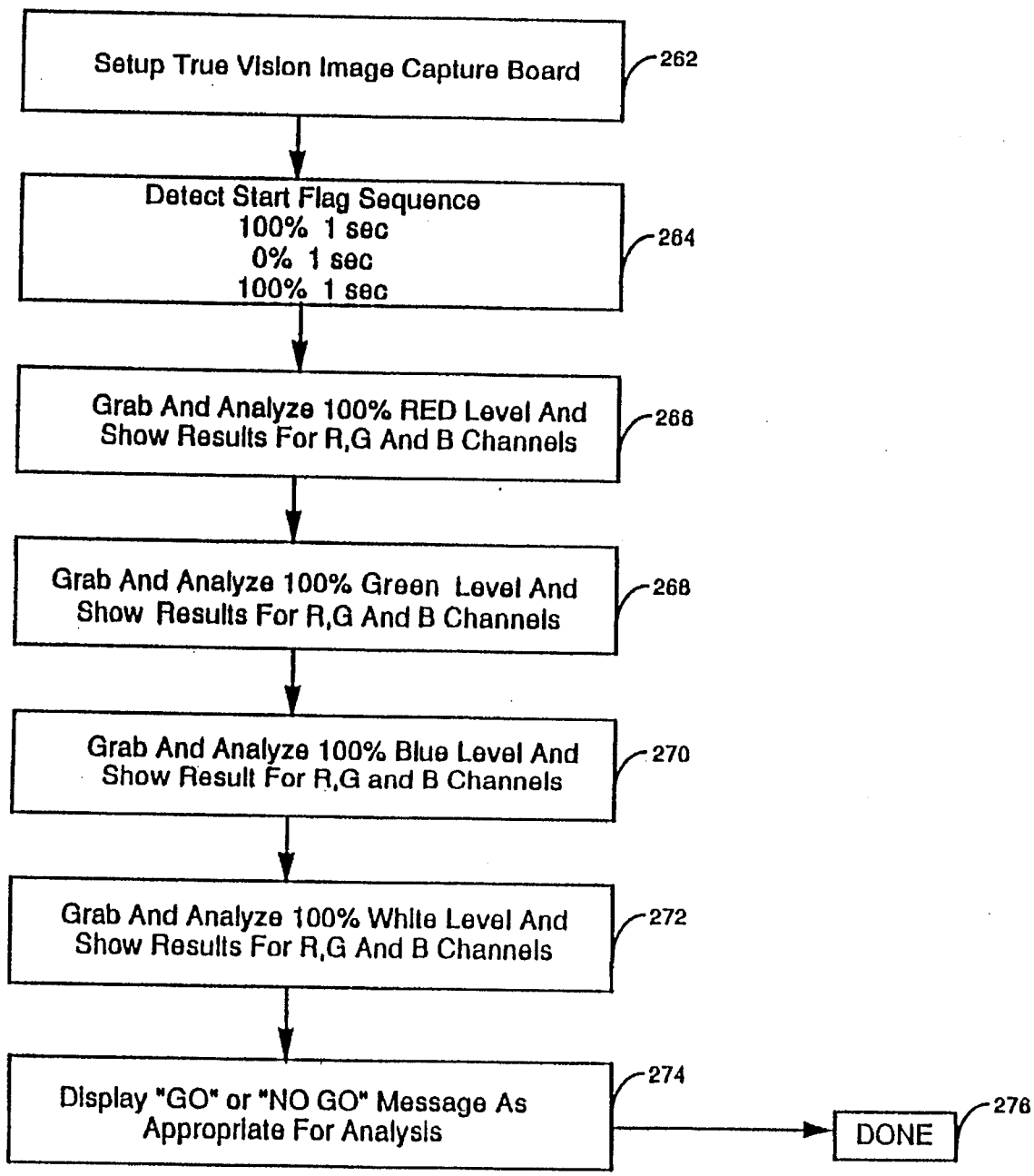
FIG. 16 is a flow chart of a color sequence test procedure.

Referring to FIG. 16, there is shown a flow chart for FGBTEST3.C and FGBTEST3C.C the color sequence test and camera set up. This program, which like all the programs in the microfiche appendix can be used in conjunction with the other programs or as a separate program. If applicable, the image capture board is first set up 262. The code is detected by the processor, here as a start flag sequence 264 indicated to the processing unit by a 100 per cent for one second, a zero per cent for one second, and a 100 per cent for one second. The 100 per cent red level is grabbed and analyzed and the results shown for red, green and blue channels 266, while the 100 per cent green, blue and white levels are separately grabbed and analyzed with results shown for the red, green, and blue channels 268, 270, and 272. Obtained levels of the various channels are then compared by the processor to the known good levels for that particular device under display, and reported as either within or outside of the accepted tolerances. Such display may be as that shown in FIGS. 12 and 13, or the like. A "go" or "no go" message, as appropriate, based on the analysis may be displayed 274 at which time the sequence is done 276.

Figure 17:
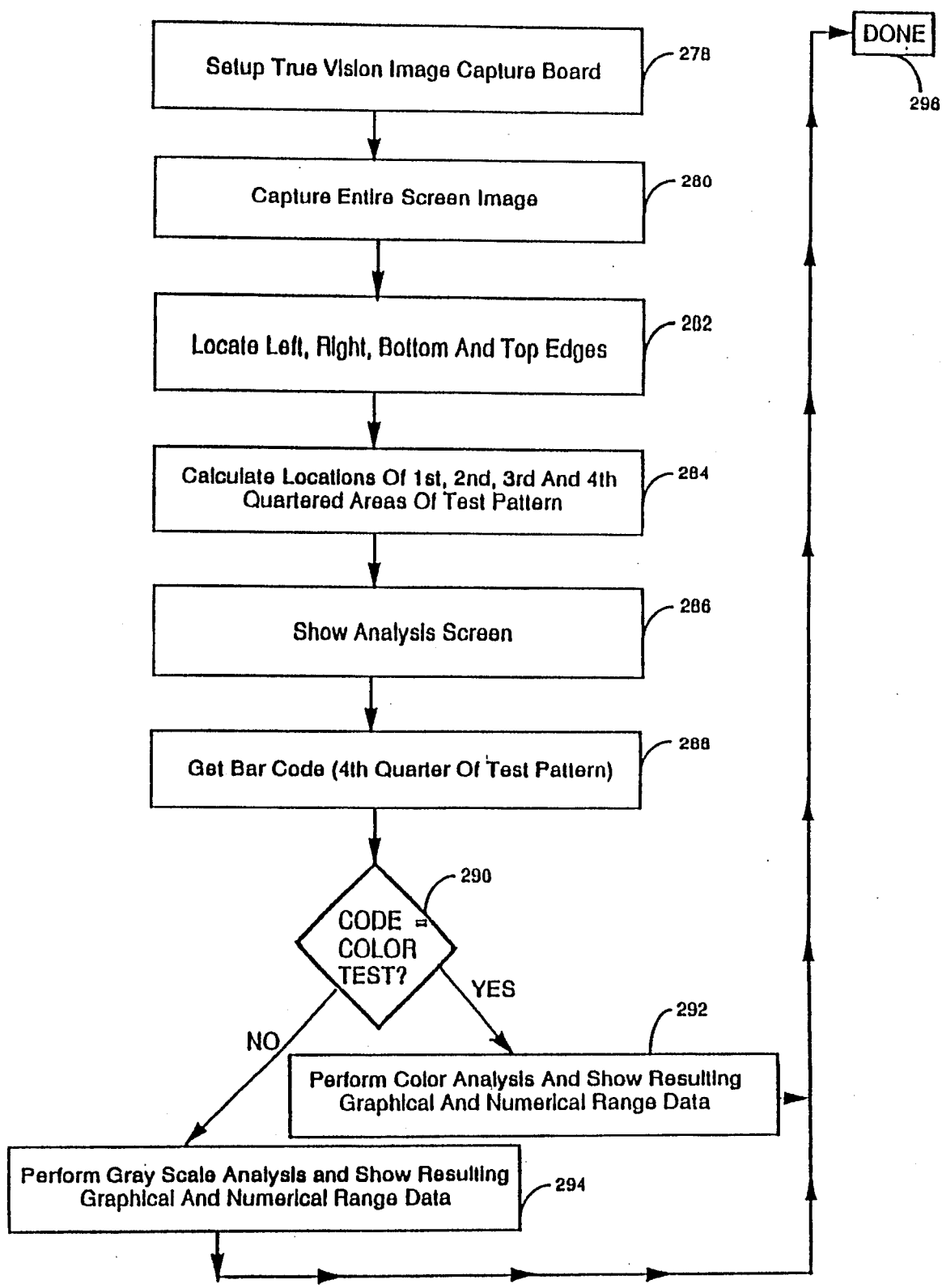
FIG. 17 is a flow chart of a test procedure utilizing the embodiment of FIG. 1.

Referring to FIG. 17, there is shown a flow chart for the FGBTESTB.C which is a computer program for the embodiment as shown in FIGS. 1 and 11, but which can be used in any setup to practice the present invention. Initially, the image capture board is setup 278 wherein the entire screen image 280 is captured by the image capture board. This assumes that the pattern generator has generated the patterns which are being displayed on the display under test. The sensor unit receives the information which is then captured wherein the left, right, bottom, and top edges are located 282 with the locations of first, second, third, and fourth quartered areas of the test pattern being calculated 284. The analysis screen is shown 286 at which time the bar code (here the fourth quarter of the test pattern) 288 is scanned to recognize the test. It should be recognized, however, that other codes as enumerated hereinabove may be utilized. The code indicates whether a color test is to be performed 290. If "yes," the color analysis per the respective red, green, and blue channels are analyzed 292 within the good performance characteristics of the display under test within the accepted imputed tolerance levels with the resulting applicable and numeral range data as shown in FIG. 13 shown on the computer screen 30 (FIG. 1). If a color test is not indicated, then the gray scale analysis is computed accordingly 294 with the results graphically shown as in FIG. 12. Although the flow chart indicates that either the color analysis or gray scale analysis is performed, both tests may be performed sequentially. The data is outputted to the screen at which time the test is done 296 and the performance characteristics determined.

Figure 18:
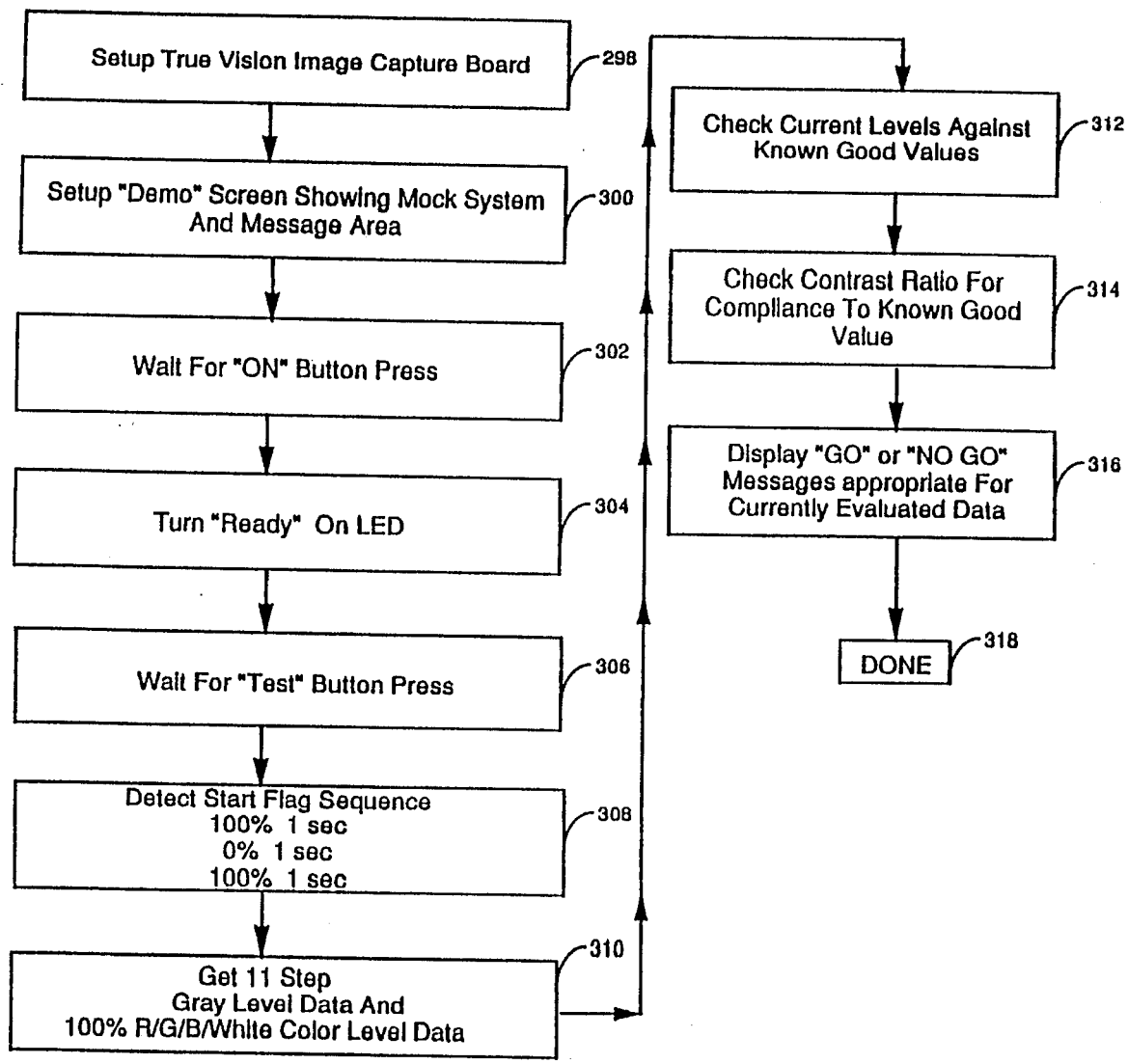
FIG. 18 is a flow chart of a combined test procedure.

Referring to FIG. 18, there is shown a flow chart which corresponds to the program labeled FGBTESTA.C. This program may be applicable to the present invention in general. It should be understood that this flow chart represents the processing portion of the unit and that the description of the entire process to assess performance of the video display is as described hereinabove. Initially, FGBTESTA.C sets up the image capture board 298. If such test is to be performed on the embodiment as shown in FIG. 1, a demo screen 300 showing the mock system message error corresponding to the system of FIGS. 5, 6, 7, and 10 may be shown on the computer screen 30. When the "on" button is pressed, 302, and when the unit is ready, the ready LED 304 comes on. The test button is pressed 306 at which time the start flag sequence, or code, of a 100 per cent in one second, zero per cent in one second, and 100 per cent in one second 308 is shown on the screen of the display under test. The eleven step gray level data and 100 per cent red, green, blue, and white color level data 310 is obtained as sequentially generated by the pattern generator and shown on the display under test. This information is checked against the known "good" values 312 which may be programmed in EEPROM in case of a unit dedicated to one type of display, or through the insertable memory card 112 with a non-dedicated test unit. The contrast ratio for compliance is checked to known "good" values 314 and a displayed NO or "no go" message, as appropriate, is displayed indicating whether the evaluated data indicates performance degradation 316 at which time, the test is done 318.

As an output to the gray Scale test conducted in accordance with the appropriate computer program and flow chart above, FIG. 12 represents a video screen 180. Video screen 180 is divided into three screens for each color channel, red channel 182, green channel 184, and blue channel 186. Solid line 188 represents the upper tolerance level for rising steps of intensity for each respective color channel as processed by the processor. Dashed line 190 represents the lower tolerance level. These tolerance levels are based on the sensor range or ability, but encompass the "perfect" video screen parameter performance levels one should expect of a normally operating, non-degraded video device of the particular kind. It should be noted that each type of video device will most likely have different parameter levels. As an example, dotted line 192 represents the actual data observed and processed by the present invention. Line 192 is within tolerance in red and green channels 182 and 184, but is not within tolerance on blue channel 186. Thus, some type of degradation has occurred regarding blue channel 186.

FIG. 13 represents an output screen 200 which is used to display color bar test on the three color channels, namely red channel 202, green channel 204, and blue channel 206. The test being conducted in accordance with the appropriate computer program and flow chart described hereinabove. In like manner to screen 180, solid line 208 represents the upper tolerance limit or level, while dashed line 210 represents the lower tolerance limit or level, the two lines encompassing the known non-degraded performance parameter levels for the video display under test. Again, dotted line 212 indicates the processed data received by the unit from the patterns generated upon the video under test. As shown, red channel 202 and blue channel 206 are shown to be within tolerance, while green channel 204 is outside of the tolerance levels, which indicates a degradation performance problem with the display regarding the green channel.

Figure 20:
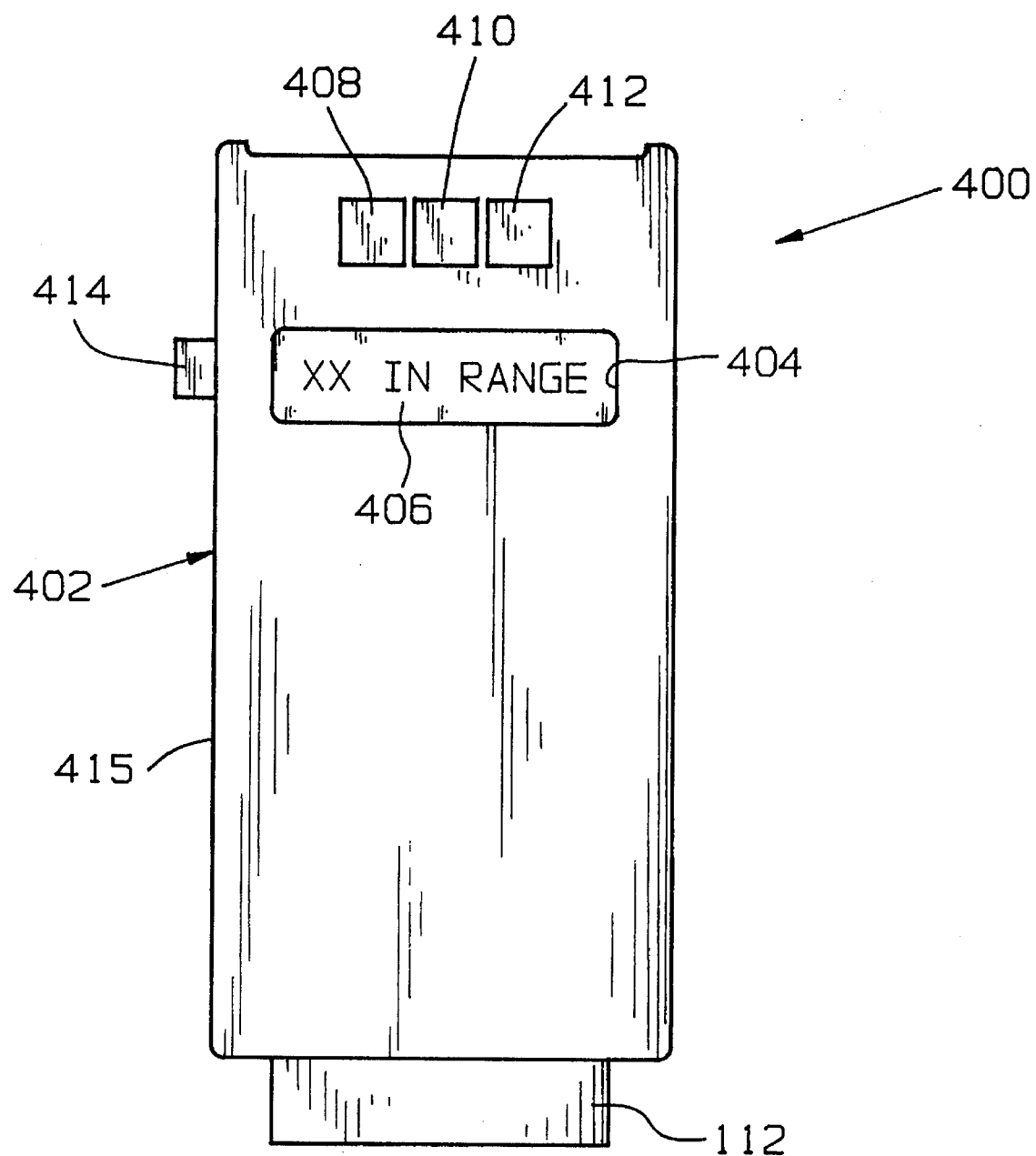
FIG. 20 is a plan view of an embodiment of an automatic video and degradation evaluation apparatus of the present invention, which may be used to carry out the logic of the flow chart shown in FIGS. 19A–19N.

Referring now to FIG. 20, there is shown another embodiment of a hand-held automatic video degradation evaluation apparatus (AVDEA) 400. AVDEA 400 is similar to AVDEA 90 shown in FIGS. 5–7 in several respects, and includes a housing 402 having an appropriately sized slot (not shown) for receiving a removable, programmable card 112 which provides the parameters, test patterns, codes and/or sequences utilized for a particular display under test. The programmable card thus contains the data for comparison to the evaluation results for a particular display under test. Housing 402 also includes an opening 404 in which is disposed a liquid crystal display (LCD) 406 for visually displaying a plurality of messages to a user, such as an "XX IN RANGE" message shown in FIG. 20. LCD 406 is operatively connected to an electrical circuit board which in turn is connected to housing 402. Housing 402 also includes respective openings (not numbered) through which project a reset button 408, calibrate button 410 and test button 412. Buttons 408, 410 and 412 are likewise electrically connected to the circuit board disposed within AVDEA 400, and may be actuated by respectively depressing the same. An ON/OFF switch 414 protrudes through a sidewall 415 of housing 402 and is used to activate/deactivate AVDEA 400. AVDEA 400 may include an optical sensor, such as a sensor assembly described with regard to FIG. 6 including a light shield 94, filter 96, light source 98, diffuser 104, etc.

Figure 19A:
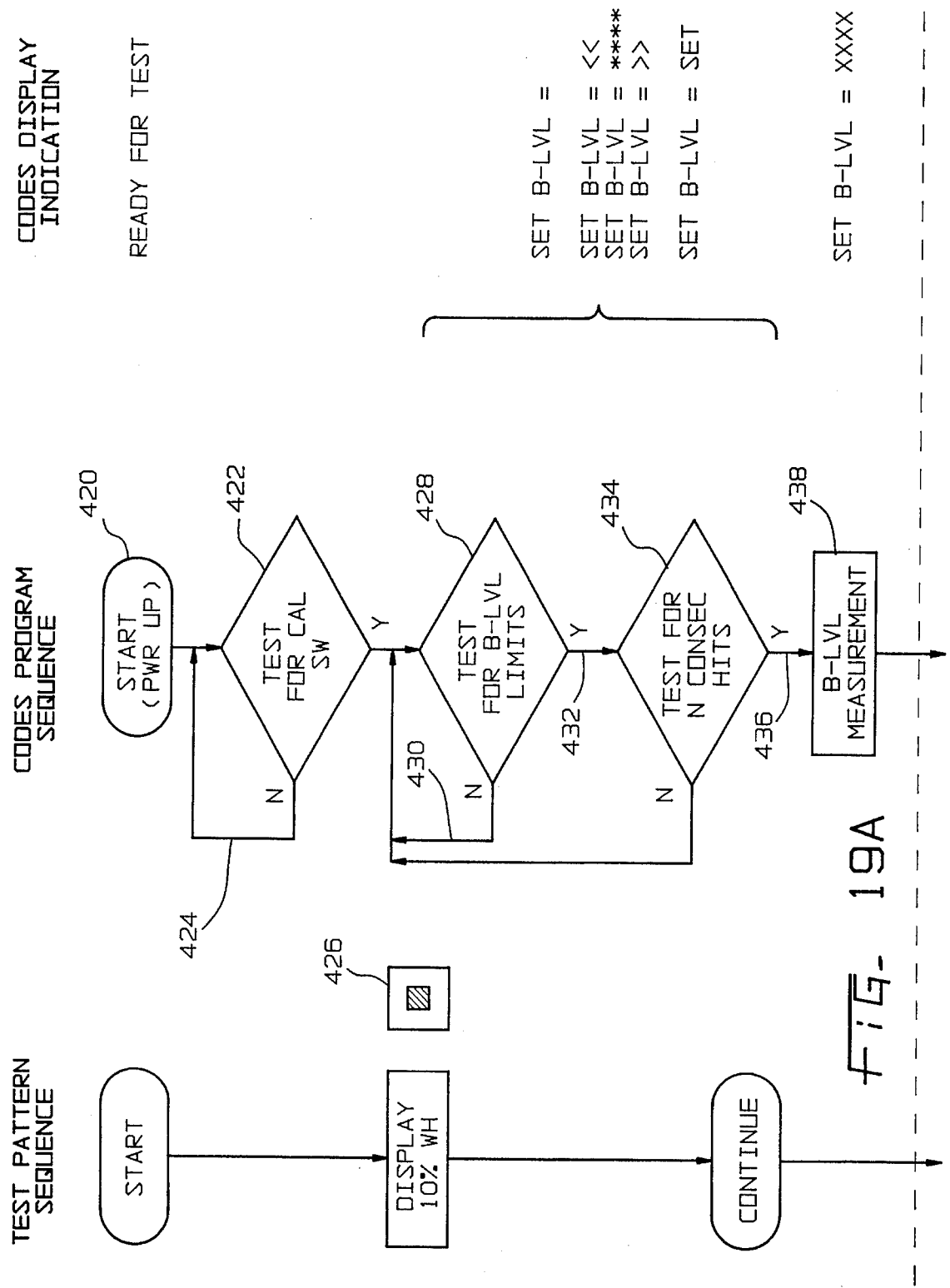
FIGS. 19A–19N are flow charts of a test procedure of another embodiment of the invention.
Figure 19B:
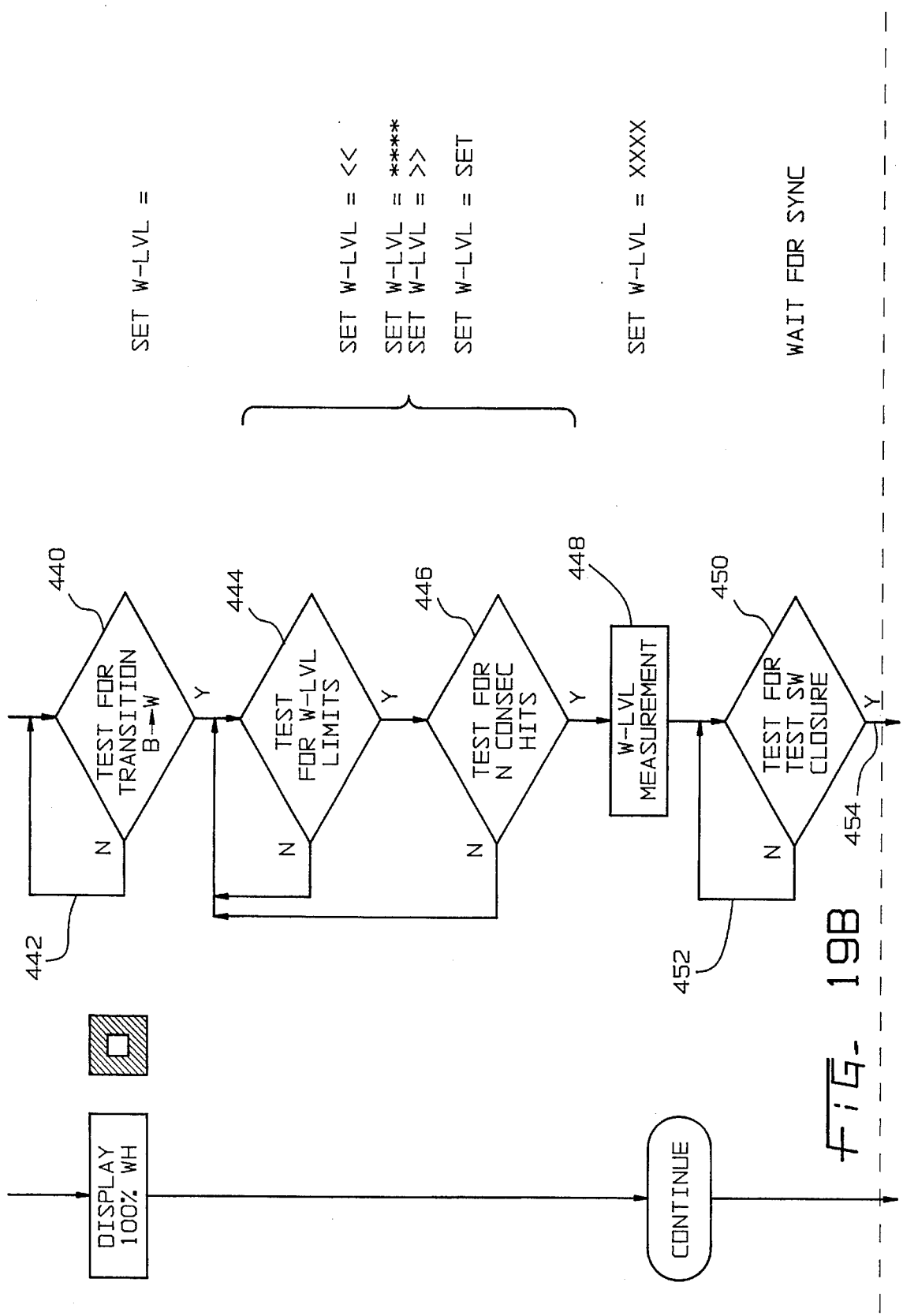
Figure 19C:
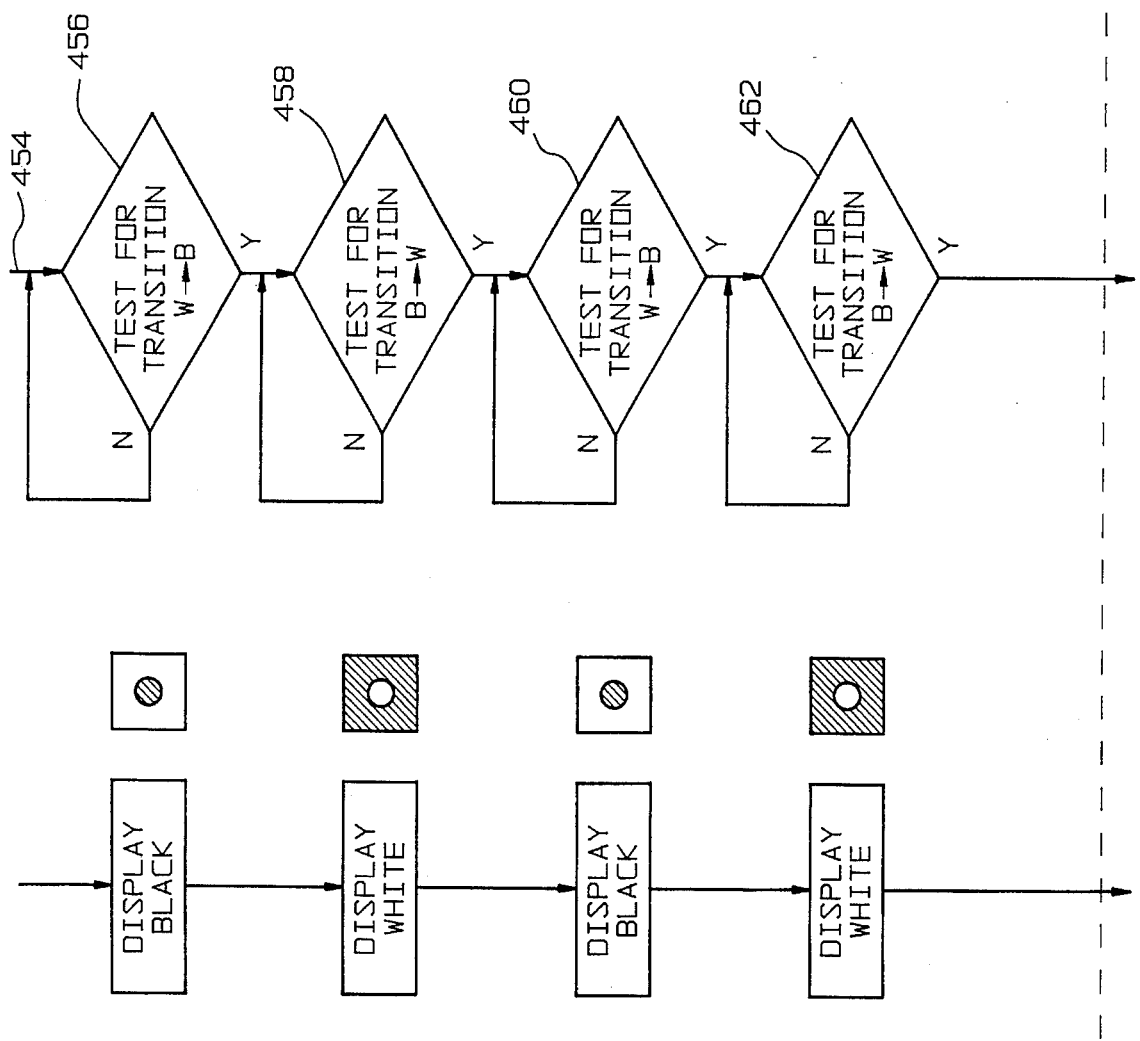
Figure 19D:
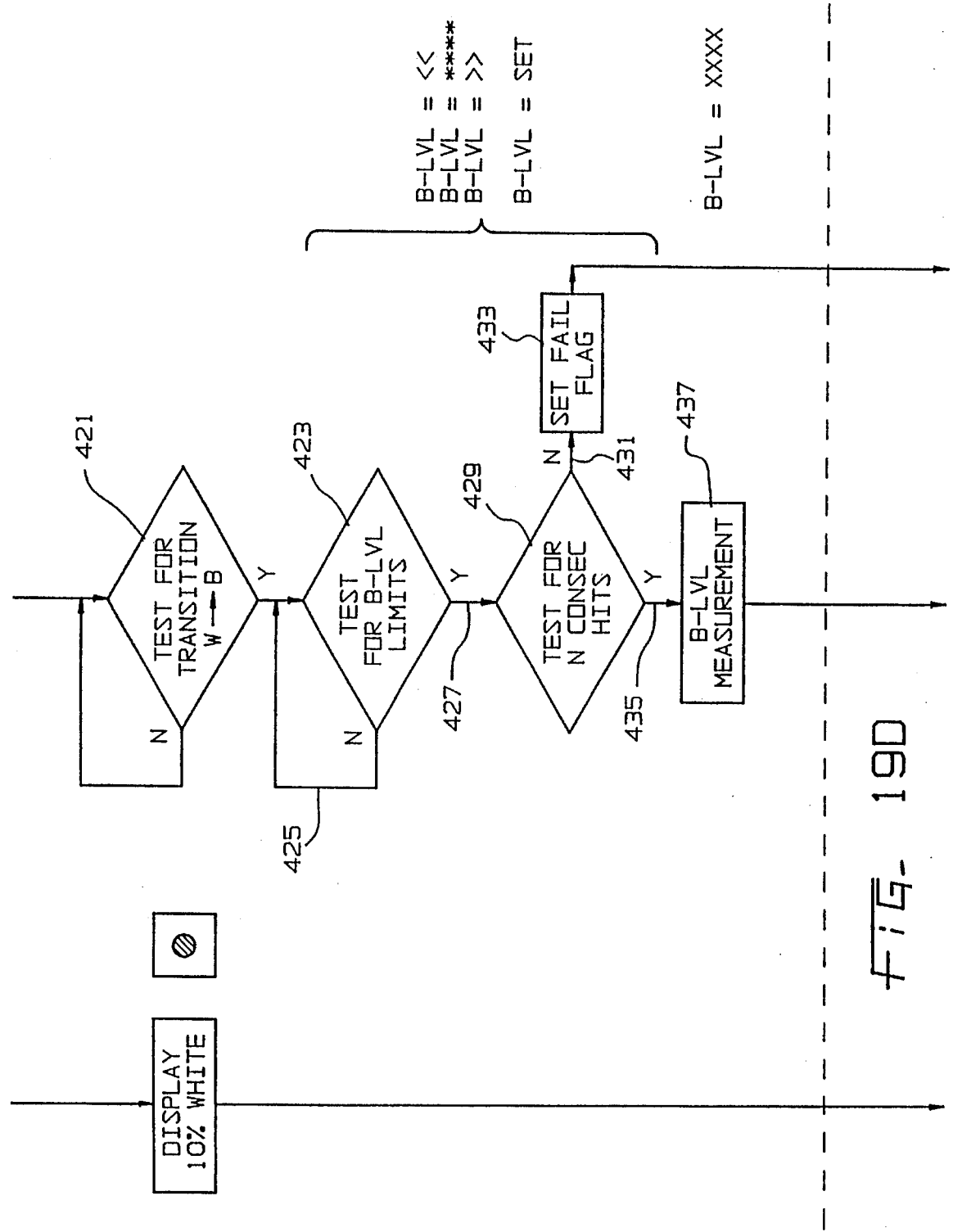
Figure 19E:
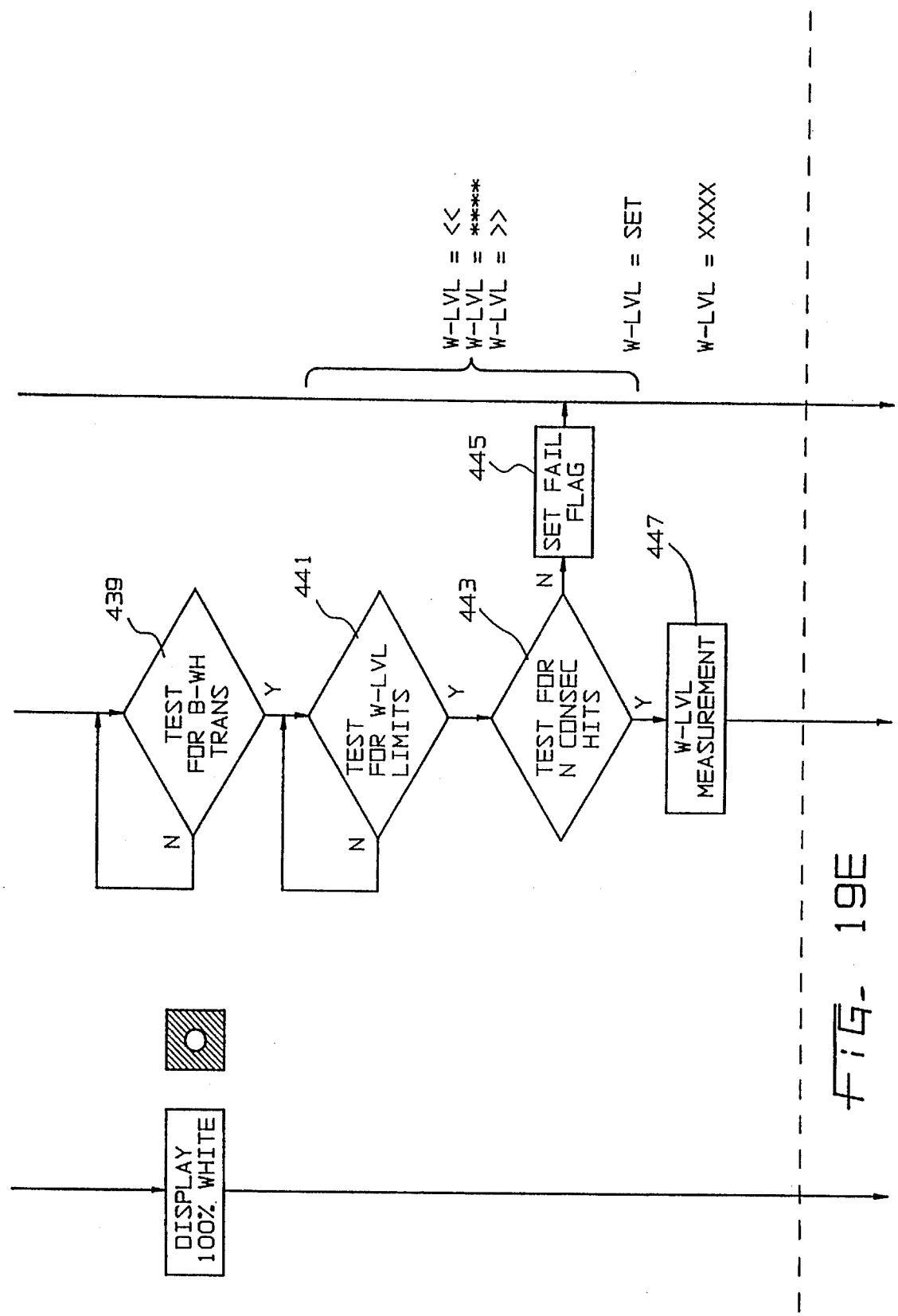
Figure 19F:
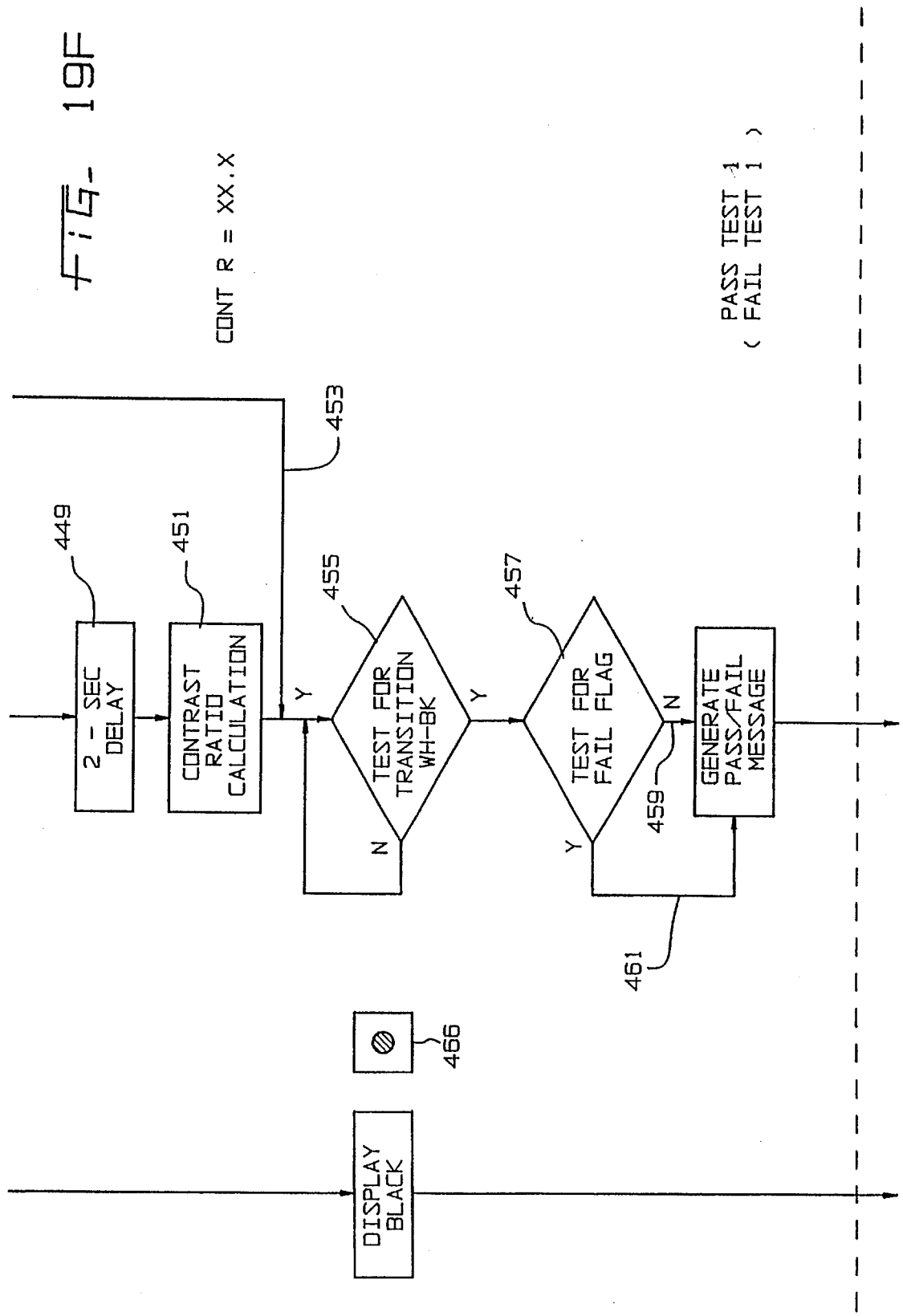
Figure 19G:
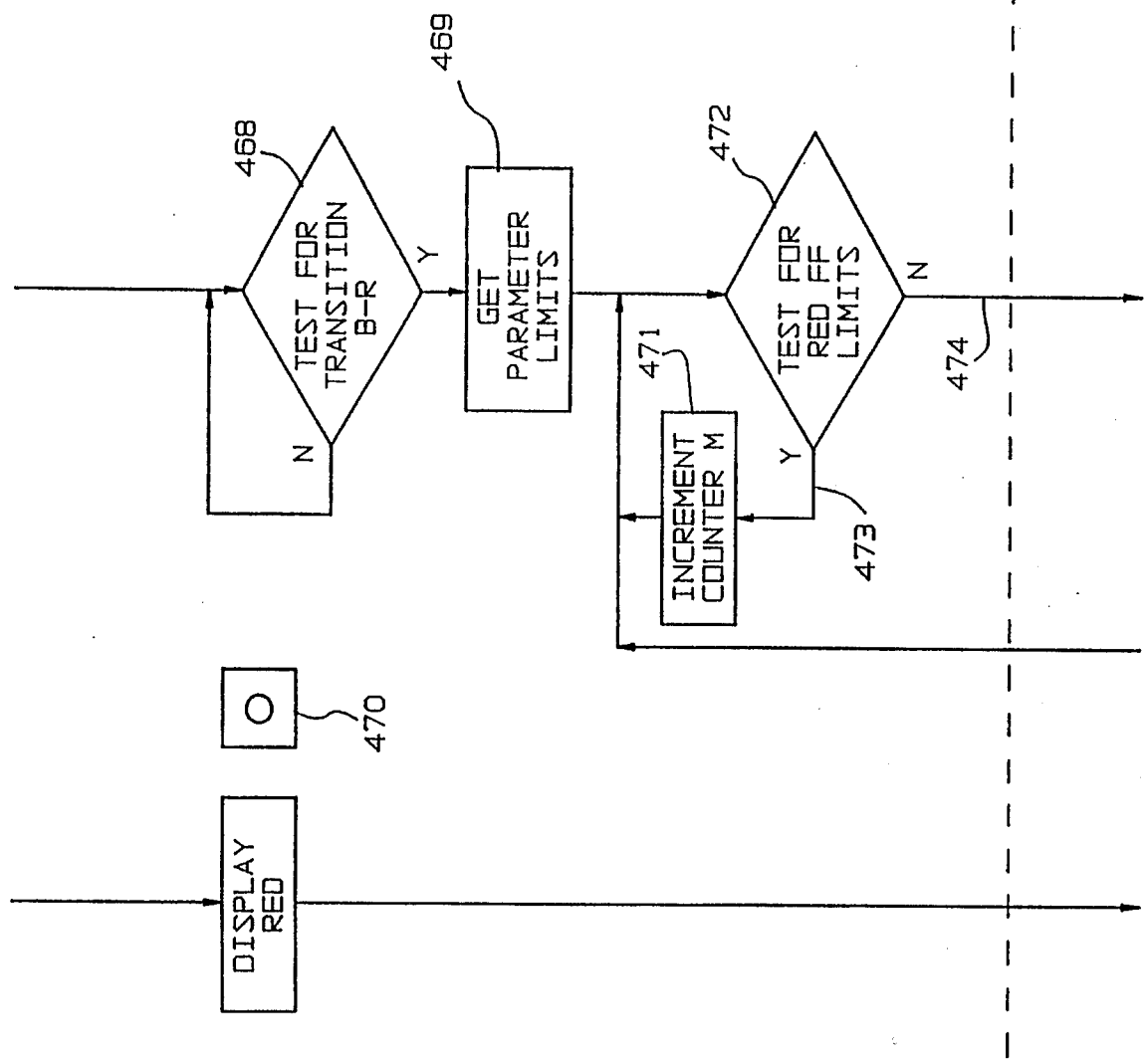
Figure 19I:
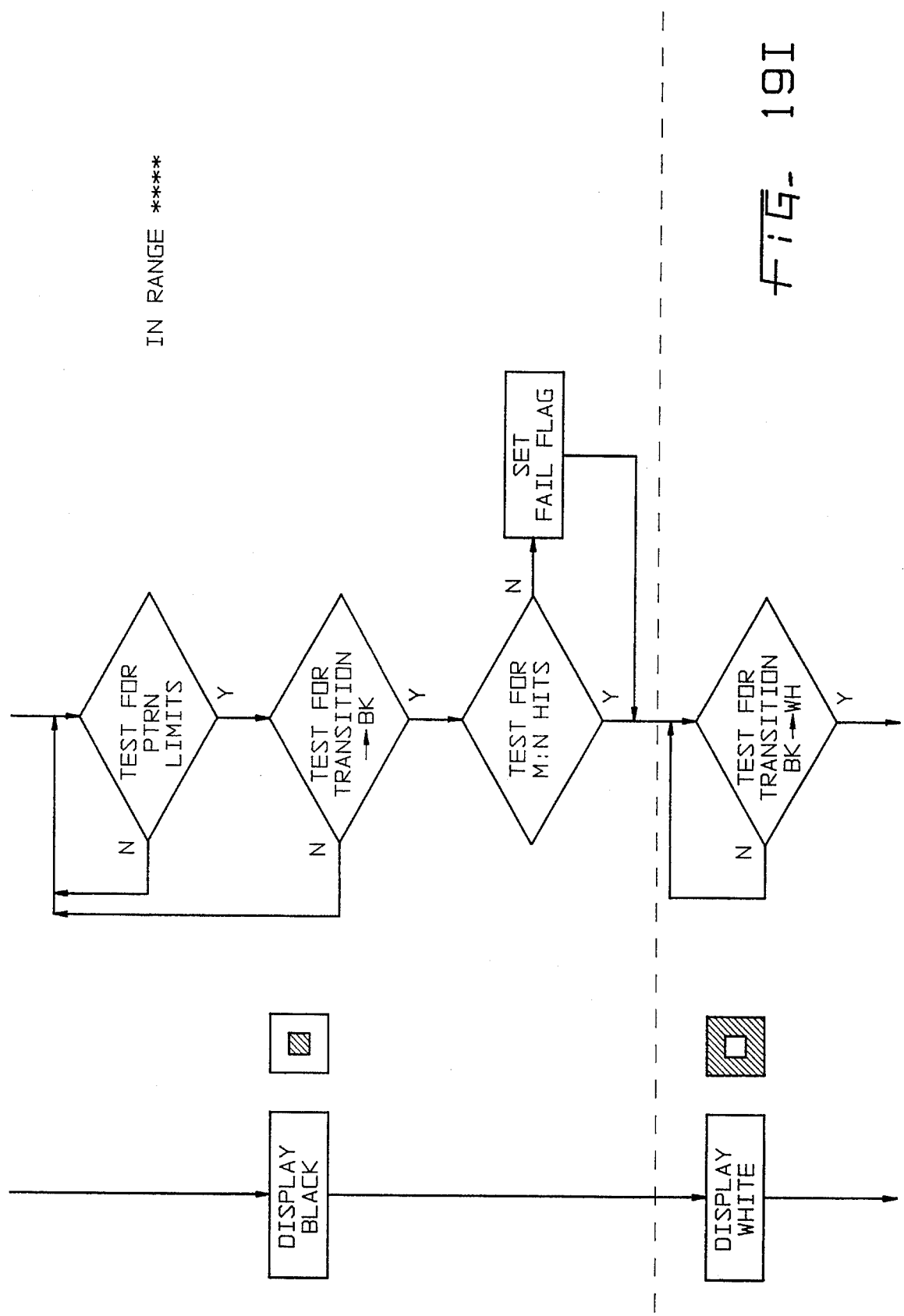
Figure 19J:
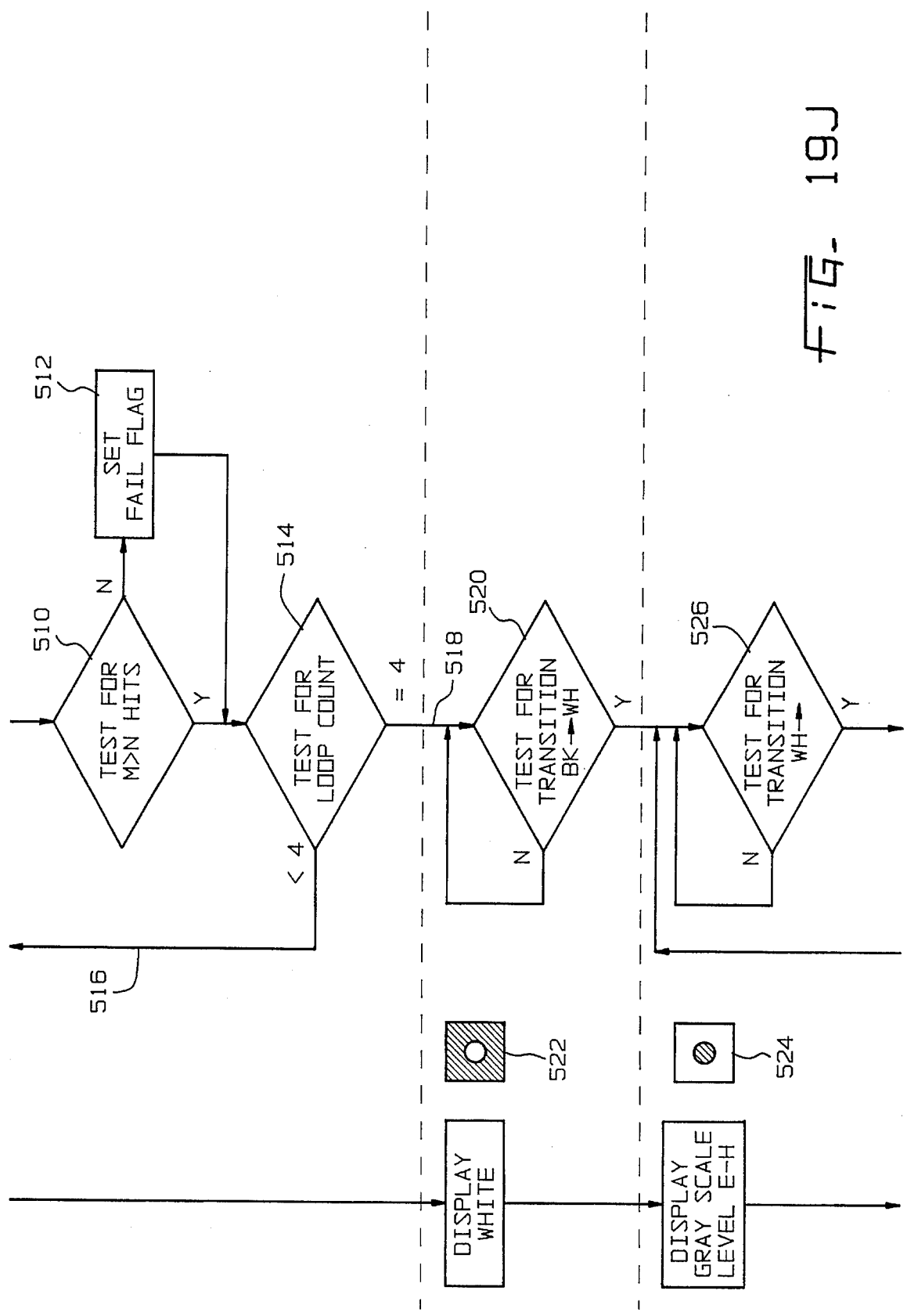
Figure 19N:
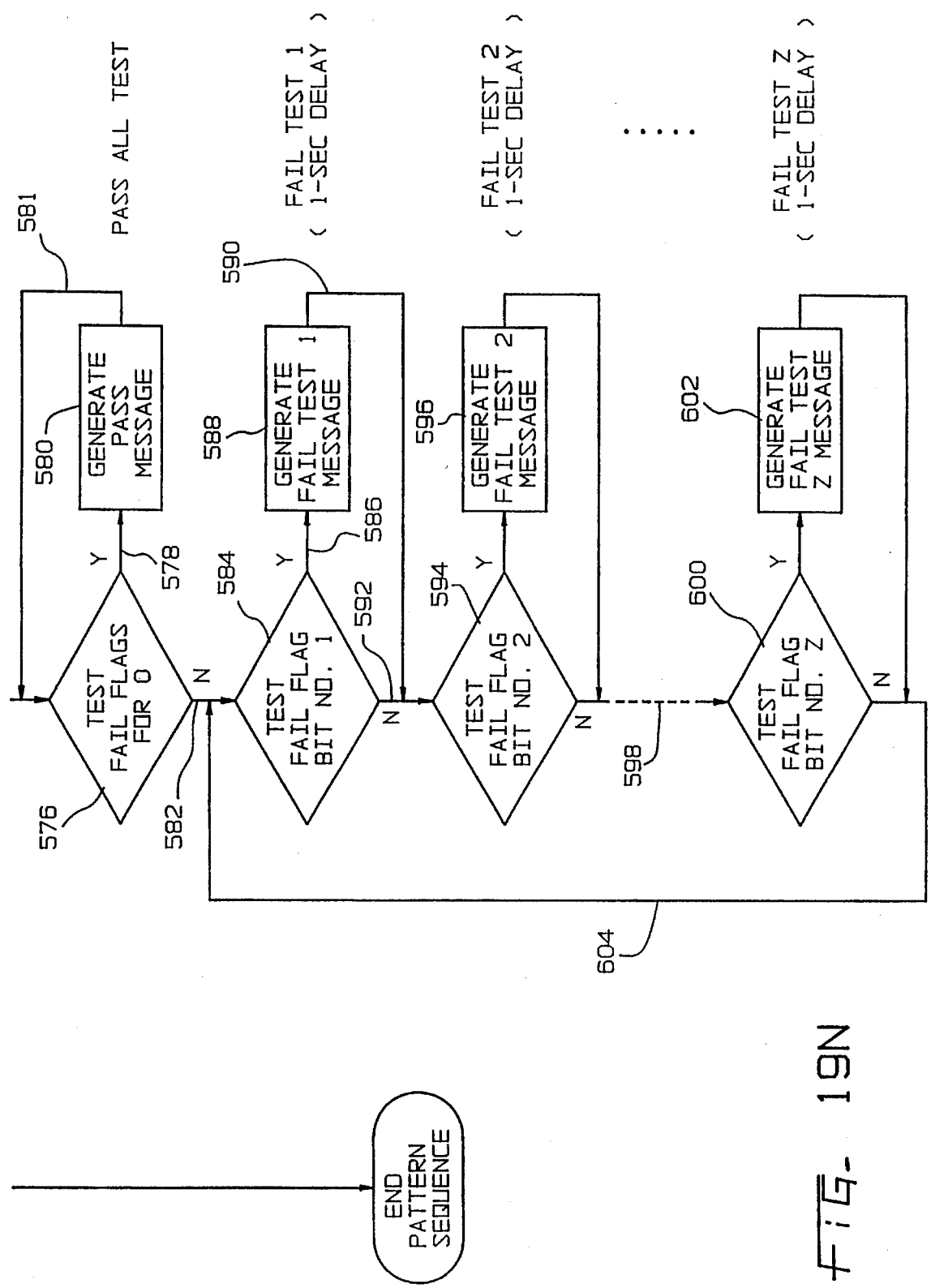

Referring now to FIGS. 19A–19N, there is shown a flow chart which illustrates the operation of a test sequence sensed by AVDEA 400. In each of FIGS. 19A–19N, the column to the left entitled "Test Pattern Sequence" designates a particular test stimulus which is displayed on the video display device; the column in the middle illustrates the logic control algorithm executed by the software on-board either the circuit board within AVDEA 400 or programmable card 112; and the column to the far right represents a message displayed on liquid crystal display 406 of AVDEA 400.

Initially, ON/OFF switch 414 is turned to the ON position 420, whereby LCD 406 displays a "READY FOR TEST" message. A decisional step 422 determines whether calibration button 10 has been depressed. If the answer is NO, the algorithm loops back at 424. With a 10% white test stimulus 426 displayed on the video display device, calibration button 410 is depressed to calibrate the black level setting. Because a pure black level illumination means that the display device is turned completely off, a 10% white, i.e., slight illumination, test stimulus is substituted therefor.

Upon depressing calibration button 410, AVDEA 400 senses the 10% white test stimulus and compares the result with predetermined data corresponding to the particular screen type at decisional step 428. More particularly, the sensed value is compared with an upper and lower limit stored in memory on the printed circuit board or programmable card 112. LCD 406 displays a "SET B-LVL=" and then a <<, >> or **, depending upon whether the sensed result is less than the lower limit, greater than the upper limit or within the lower and upper limits. The << and >> signs correspond to a message which is displayed if decisional step 428 is NO as shown at line 430. Contrarily, the "SET B-LVL =" message is displayed if the result from decisional step 428 is YES as shown at 432. A user manually adjusts the display screen to obtain the desired "SET B-LVL=**" message.

Decisional step 434 ensures that the adjusted black level is a stable measurement by requiring that the sensed value remain between the upper and lower limits for a predetermined number of sensed values. For example, if N were set to the value 4, then decisional step 434 would require that the sensed value be within the upper and lower limits for four consecutive samples before accepting the adjusted 10% white test stimulus as being properly set, and displaying a "SET B-LEVEL=SET" message. After the black level is set at 436, a black level measurement is taken at 438 and the actual decimal value corresponding thereto (represented generically by the letters "XXXX") is displayed by LCD 406.

At decisional step 440, a determination is made whether the displayed image has been changed from black (i.e., 10% white) to 100% white. Changing the displayed image from black to white may be accomplished by a manual trigger of programmable test pattern generator 24, or a time dependent switching thereof. If the result from decisional step 440 is NO 442, then the algorithm loops back to the input of step 440. While waiting for the displayed image to change from black to white, a message "SET W-LVL=" is displayed on LCD 406.

When a transition from black to white is detected, the white level test image is calibrated and measured at steps 444, 446 and 448 using logic which is the same as that indicated above for the black level calibration and measurement which occurs in steps 428, 434 and 438. As with the black level calibration and measurement, the 100% white level displayed on the video display device is manually adjusted to the proper white level.

After taking the white level measurement in step 448 and displaying the corresponding decimal value thereof, a decisional step 450 effects a loop which causes the control algorithm to wait until test button 412 is depressed before proceeding. More particularly, decisional step 450 determines whether test button 412 has been depressed, i.e., closed, and if the result is NO 452, the algorithm loops back to the input of decisional step 450. When the test button is depressed at 454, a "WAIT FOR SYNC" message is displayed on LCD 406. This message indicates that AVDEA 400 is waiting for a predetermined synchronized pattern which indicates the beginning of actual testing. In the embodiment shown in the drawings, and illustrated in FIG. 19C, the synchronized pattern includes a black-white-black-white transition which is respectively detected at each of steps 456, 458, 460 and 462.

FIGS. 19D and 19E illustrate a redundant measurement of the black and white levels, as similarly illustrated in FIGS. 19A and 19B. In particular, decisional step 421 waits for and senses a black (i.e., 10% white) test stimulus. Decisional step 423 compares a result of the sensed 10% white test stimulus with an upper and lower limit stored in memory on the printed circuit board or programmable card 112. As indicated above with regard to steps 428–438, LCD 406 displays a "SET B-LVL=" and then a <<, >> or **, depending upon whether the sensed result is less than the lower limit, greater than the upper limit or within the lower and upper limit, respectively. The << and >> signs correspond to a message which is displayed if decisional step 423 is NO 425. On the other hand, the "SET B-LVL=" message is displayed if the result from decisional step 423 is YES 427. Decisional step 429, similar to decisional step 434 in FIG. 19A, ensures that the adjusted black level is a stable measurement by requiring that the sensed value remain between the upper and lower limit for a predetermined number of sensed values. If the adjusted black level is No 431, i.e., the sensed value is not within the upper and lower limit for N consecutive samples, the fail flag is set in step 433. Contrarily, if the sensed value remains within the upper and lower limits for N consecutive hits, a YES result 435 occurs and a black level measurement is taken in step 437, with the numeric value corresponding thereto displayed on LCD 406**.

Steps 439–447 utilize the same logic as described above with regard to steps 421–437 to manually set and evaluate a 100% white display test image.

Step 449 introduces a 2 second delay which maintains the "W-LVL=XXXX" message on LCD 406, where XXXX represents a numeric value of the 100% white display test image. Thereafter, in step 451, a contrast ratio calculation is performed utilizing the black level measurement and white level measurement respectively determined in steps 437 and 447, and a decimal value corresponding thereto displayed on LCD 406. Line 453 sets a fail flag in memory, such as a bit at a particular location in memory, if such fail flag is generated by steps 433 and/or 445.

Decisional step 457 tests for the existence of a fail flag set in either of steps 435 and/or 445, and generates a corresponding pass message if the result is NO 459, or a fail message if the result is YES 461.

At looped decisional step 455, a determination is made whether a black test image 466 is displayed on the video display device. Black image 466 defines a video trigger signal which is displayed between adjacent test images, e.g., red, green, blue, gray scale, etc. to indicate to AVDEA 400 that a new test image will subsequently be displayed. To wit, in theory, AVDEA 400 is able to recognize the transition from a red test image to a green test image without such a video trigger signal. However, it is possible that one of the test images, e.g., red test image, could be far enough out of the predetermined limits that AVDEA 400 would not recognize the transition from one color to another. Likewise, when displaying various gray scale steps on the video display device, AVDEA 400 may not recognize the transition from one step to another. Because of the calibration at the beginning of the test, AVDEA 400 does, however, recognize a black image or white image which is displayed on the video display device. Accordingly, a video trigger signal, such as a black or white trigger image, provides a clear transition from one test image to another.

Looped decisional step 468 waits for a transition from a black trigger image 466 to a red test image 470. Red test image 470 comprises a flat field test image. Upon detection of red test image 470, step 469 obtains parameter limits associated with the particular test image, i.e., red test image 470. To wit, a memory fetch yields an upper limit and a lower limit associated with red test image 470. A sensed value between the upper and lower limit is considered to be a good sample, whereas a sensed value outside the upper and lower limits is deemed to be a failed sample. Decisional step 472 tests whether a numerical value associated with red test image 470 is within the fetched upper limit and lower limit stored in memory. If the result is YES at 473, an "IN RANGE **" message is displayed on LCD 406 and a counter M is incremented at step 471. On the other hand, if the result is NO 474, counter M is decremented by 1 at step-475. Since the system of the present invention is an open loop system, each of the test images and video trigger signals are displayed for a predetermined period of time, and decisional step 476 determines whether the displayed image changes from a red test image 470 to a black trigger signal 466. If the result is NO, the algorithm loops back to the input of decisional step 472 at line 478 where another sample is taken to determine whether the current sensed signal is a red flat field image falling within the upper limit and lower limit, as described above. When decisional step 472 determines that a particular sample is between the upper and lower limit, a unique flag word is either set in memory or changed in memory. Moreover, each time decisional step 472 determines that the present data sample either falls within or does not fall within the upper and lower limits, a counter M is incremented or decremented in memory from a predetermined number. For example, assuming that red test image 470 is displayed for a period of approximately 1 second, the value of M could initially be set to 8 (which corresponds to a presumed number of data samples within a period of 1 second). If decisional step 472 thus takes a sample 8 times during the length of time which red test image 470 is displayed, the counter M would be incremented to a value of about 16. Contrarily, if the value of M is set to 8 and decisional step 472** does not determine that any of the 8 samples falls within the upper and lower limit, then the counter M would be decremented to a value of 0.

When a transition from a red test image 470 to a black trigger signal 466 is determined at step 476, decisional step 480 then determines whether value M has been incremented or decremented above or below a predetermined number N. For example, assuming that 8 data samples can be taken at step 472 during the time period in which red test image 470 is displayed, the variable N could be set to the value 9. That is, if at least 5 out of the 8 data samples are within the upper and lower limit, then the test would be considered a pass and a YES result 482 would occur. Conversely, if 4 or less of the data samples are determined to be within the upper and lower limit stored in memory, then a NO result 484 occurs and a fail flag is set in step 486.

Decisional step 488 determines whether the fail flag has been set in step 486. Moreover, if no sample was received at decisional step 472 which was within the upper and lower limit, then the value of M remains at the preset value 8. Thus, in the situation where no samples are within the upper and lower limit, the initially preset value of M would not be incremented or decremented and decisional step 480 would return a false result of tests at 482. It is thus unnecessary in step 488 to determine whether the flag word which was initially set in memory retains the original value. A flag word which is unchanged also results in an output YES 490 from decisional step 488.

If a NO result is generated by decisional step 488, a "PASS TEST 2" message is generated at step 492. Conversely, if a YES result 490 is generated by decisional step 488, a "FAIL TEST 2" message is generated at step 492.

For purposes of discussion, only a red test image 470 is shown in the drawings. However, it is to be understood that a plurality of other flat field test images, such as green and blue, could also be easily incorporated into the algorithm using the logic set forth in steps 468–492 and described above.

Decisional step 494 tests for a transition from black trigger image 466 to a first step of a gray scale test image 496. If the result is NO 498, the algorithm loops back to the input of decisional step 494. Conversely, if the result is YES 500 then a numeric value associated with gray scale test image 496 is compared with an upper limit and a lower limit stored in memory, at looped decisional step 502. If the result is YES at 504, a variable M having a predetermined value is incremented by 1 at step 505. Conversely, if the result from decisional step 502 is NO 506, then the present value of M is decremented by 1 at step 507. In step 508, a test for a transition in gray scale test image 496 to a black trigger signal 466 is conducted. If the result is NO 510, the algorithm loops back to the input of decisional step 502 and another data sample is taken. This loop continues until black trigger image 466 is displayed on the video display device.

If the result from decisional step 508 is YES, meaning that a black trigger image was detected, then the present value of M is compared with a predetermined number N as described above with regard to step 480. If the present value of M is less than or equal to the predetermined value N, then a fail flag is set in step 512.

In step 514, a test is made to determine whether a loop counter has been incremented to a predetermined number, corresponding to the number of gray scale steps exhibited as a gray scale test image 496. More particularly, in steps 494 through step 514, four separate stepped gray scale test images 496 (levels A–D) are displayed on the video display device. The loop counter in step 514 thus corresponds to the number of gray scale steps to be tested. If the result is NO 516, then the control algorithm loops to the input of decisional step 494. Conversely, if the result is YES 518 (meaning that each of the gray scale stepped levels A–D has been tested), then looped decisional step 520 determines the occurrence of a white trigger image 522.

Gray scale test image 524 represents respective stepped gray scale levels E–H, which are darker than gray scale images 496. Accordingly, to provide a high contrast between respective stepped gray scale test images 524, a white trigger image 522 is utilized instead of a black trigger image 466. Steps 526–536 use the same logic as described above with regard to steps 494–514.

Step 538 tests for a fail flag set by either of steps 512 or 534. If a fail flag is detected, a YES result 540 is generated which results in a "FAIL TEST 3" message being displayed on LCD 406, thereby indicating that at least one of the gray scale steps was not within the upper limit and lower limit. On the other hand, if no fail flags are detected, either from steps 512 or 534, then a NO response 542 is generated, which results in a "PASS TEST 3" message being displayed on LCD 406.

Steps 494–514 and 526–536 show respective decisional boxes 514 and 536 which test for a loop counter. Of course, it will be appreciated that loops 516 and 537 could be eliminated and in-line code implemented. That is, the logic contained in steps 494–512 and 526–534 could be repeated for each of the gray scale steps without the use of a loop.

Looped decisional step 546 waits for a change from white trigger image 522 to a three pixel resolution test pattern 548, which provides an indication of an average brightness of the video display device. If a YES response 550 is returned from decisional step 546, meaning that a three pixel resolution test image has been displayed on the video display device, a memory fetch to obtain an upper and lower limit corresponding to the three pixel resolution pattern 548 is performed in step 551. Looped decisional step 552 compares a numeric value representing the three pixel resolution test image with the upper limit and lower limit, and displays an "IN RANGE ****" message if the numeric value is found to fall therebetween. If the result from decisional step 552 is YES, meaning that the numeric value was within the range defined between the upper limit and lower limit, then counter M is incremented by 1 in step 555 and the algorithm returns to the input of decisional step 552 for another sample. If the result from decisional step 552 is NO 556, meaning that the numeric value was not within the range defined between the upper limit and lower limit, then counter M is decremented by 1 in step 557 and decisional step 558 determines whether the particular sample is a black trigger image 466. If the sample was found not to be within the upper and lower limit in step 552 and is determined not to be a black trigger image 466 in step 558, then a NO response 560 is generated and the algorithm loops to the input of step 552.

On the other hand, if a black trigger image 466 is detected in step 558, then decisional step 562 is carried out, as described above with regard to steps 480, 510 and 532. If the value of M is less than or equal to the predetermined number N, then a NO result 564 and a fail flag is set in step 466. Otherwise, a YES result 568 occurs from step 562 and a fail flag is not set.

Steps 546–566 describe a control algorithm for a three pixel resolution test image which is displayed upon a video display device. However, it is to be understood that other similar tests, such as a two pixel resolution test and a one pixel resolution test, could easily be incorporated into the algorithm and would use the same logic as described above with regard to steps 538–566.

Decisional step 576 tests for fail flags from each separate test, e.g., red, gray step, three pixel, and determines whether each particular test was passed or failed. In the embodiment shown, it is envisioned that a particular portion of memory is set aside having a number of bits corresponding to the number of tests performed. A "zero" bit could correspond to a pass test for a particular test, while a "one" bit could correspond to a fail for a particular test. By knowing the position of the respective bits, it may thus be easily determined in step 576 whether or not any or all of the tests were passed. If no fail flags are determined in step 576, e.g., the summed value of all bits equals "zero", then a YES result 578 occurs and a "PASS ALL TESTS" message is generated on LCD 406 at step 580. Line 581 indicates that the logic loops back to the input of decisional step 576 for a loop which is repeated until AVDEA 400 is turned off.

On the other hand, if a fail flag is determined in step 576, a NO result 582 occurs which results in a generation of one or more "fail test" messages being displayed on LCD 406. More particularly, step 584 checks the first bit for a fail (i.e., "1") bit. If a fail bit is detected, a YES result 586 occurs and a "FAIL TEST 1" message is generated on LCD 406 at step 588. Such a message, as indicated in the right hand column, is succeeded by a one second delay allowing visual observation by a user. After displaying the fail test message, as indicated at line 590, and also upon the failure to detect a fail bit in step 584, as indicated at NO result 592, the logic then proceeds to test the next fail flag bit in memory, as indicated at steps 594 and 596. The control logic continues to test each bit and display a corresponding message if a fail flag bit is determined, as indicated by dash line 598. Finally, the last fail flag bit in memory is detected (as indicated by the letter "Z"), and a corresponding fail message is generated at step 602. Line 604 indicates that the logic loops back to the input of step 584 for repeating the tests which are failed, until such time that AVDEA 400 is turned off by the user. Of course, although steps 584–602 illustrate testing of each of the fail flag bits using in-line code, it will also be readily apparent to a person of skill in the art that a loop could be utilized to advance through and test each of the fail flag bits stored in memory.

Each of the embodiments shown in the drawings is directed to an open loop electronics/video display degradation evaluation apparatus. More particularly, the programmable test pattern generator does not provide or receive data from the automatic video degradation evaluation apparatus. Rather, the programmable test pattern generator displays an embedded code among the plurality of test stimuli. In the embodiment shown in FIGS. 19A–19N, the code comprises a particular sequence of test stimuli having different colors. Each of the programmable test pattern generator 24 and AVDEA 400 are programmed to generate and receive a particular sequence of test stimuli. The embedded code is therefore made up of the particular sequence utilized for a particular display device.

In the embodiment described in FIGS. 19A–19N, each of the particular tests, e.g., red, gray scale and three pixel resolution, are performed. However, it is to be understood that the algorithm could be easily modified whereby the program halts upon the failure of one test. That is, the algorithm would not execute each separate test regardless of whether such test was passed or failed, and subsequently display a message of which test(s) were failed.

Moreover, in the embodiment shown in FIGS. 19A–19N, the various test images and trigger images are displayed for a period of about one second each. However, it is to be understood that the time period for displaying a particular test stimuli can be easily varied.

Although this invention has been described in connection with electronic signal in/video out devices such as CRT's, plasma screens, LCD screens, fluorescent screens, and the like, it should be appreciated that other electronic devices may be evaluated for performance degradation in accordance with the principles of the present invention. Thus, electronic devices having signal in/signal out functions, e.g. recorders, amplifiers, image processors, and transmission links, may be tested. In order to implement the concept of the present invention regarding signal in/signal out devices, the following equipment would be utilized. A video signal generator, programmable or dedicated as the application demands, with identity code insertion for the scan rate, format, and signal content being produced. The identity code may originate within the signal generator unit or be introduced from another source such as a computer. The identity code may be inserted either in the active video time or in the blanking intervals, horizontal or vertical, as desired. A video receiver device which can, from the input video signal, decipher the rate and test information present, and make analysis of the test information according to either preset internal instructions or pass basic information to some other device, such as a computer, for analysis. The video receiver may be dedicated, or may be programmable by keyboard entry, disk, or other means to set up conditions to be recognized by the receiver.

Also, electronic devices having light in/signal out functions, e.g. video cameras or other such sensors, may further be evaluated for performance degradation in accordance with the principles of the present invention as detailed hereinabove. In order to implement the concept of the present invention regarding light in/signal out devices, the following equipment would be utilized. A test chart containing an appropriate pattern of a test stimulus plus identity code in the active image area. The test chart may be produced in may forms, for instance, charts printed on paper of other substrate, or produced electronically by pattern generators or computer and displayed on a CRT for viewing by the camera under test. In the case of electronically produced charts by pattern generators, due consideration must be given to scan rate differential and information density to assure a proper test capability. A video receiver device which can, from the input camera video signal, decipher the test information according to either preset internal instructions or pass basic information to some other device, such as a computer for analysis.

Thus, all of these types of electronic devices may be automatically tested for performance degradation utilizing the methods herein described. However, in order to utilize the present methods of performance degradation evaluation, some modification of the equipment may be necessary in order to accomplish the desired result. Such modification of equipment would be well within one skilled in the art utilizing the principles as set forth hereinabove.

Even further, such automated testing as described herein may be utilized with devices utilizing any type of electromagnetic energy.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for automatically evaluating the performance of an electronic video display device, said method comprising the steps of:

generating a time sequenced plurality of test stimuli and inputting said test stimuli sequence to the video display device for display of respective test images thereon, said test stimuli sequence defining an embedded code;

providing a processor capable of recognizing said embedded code;

sensing said plurality of test stimuli and outputting signals corresponding thereto to said processor;

analyzing said test stimuli in the sequence defined by said embedded code with said processor, to evaluate the performance of the video display device; and providing by means of an output device an indication of the performance of the video display device.

2. The method of claim 1, wherein said test stimuli sequence includes a plurality of optical trigger images, each said trigger image indicating a beginning of a predetermined test.

3. The method of claim 1, comprising the further step of programming said processor to determine said embedded code.

4. The method of claim 3, comprising the further step of providing said processor with a programmable card.

5. The method of claim 3, wherein said programming step includes programming said processor to include an applications program corresponding to said embedded code.

6. The method of claim 5, comprising the further step of recording data utilized by said processor, said applications program comparing at least one of said data with a respective said test stimuli to evaluate the performance of the video display device.

7. The method of claim 6, wherein said recording step comprises the step of recording said data in a memory device contained within said processor.

8. The method of claim 5, wherein said embedded code is indicative of current test parameters, said current test parameters represented by at least one predetermined said datum.

9. The method of claim 1, wherein each said test stimuli comprises a single parameter test pattern.

10. The method of claim 1, wherein said providing step comprises providing a visual indication of the performance of the video display device.

11. The method of claim 1, wherein said determining, analyzing and providing steps are carried out using a hand held processor.

12. A system for automatically evaluating the performance of an electronic video display device, comprising:

means for generating test stimuli and inputting said test stimuli to the video display device for display of a test image thereon, said test stimuli including an embedded code indicative of current test parameters; and means for sensing and processing said test stimuli, dependent on said embedded code, to evaluate the performance of the video display device;

wherein said sensing and processing means is optically connected to said generating means and has an absence of a data connection with said generating means.

13. The system of claim 12, wherein said generating means generates a plurality of test stimuli defining a sequence of test stimuli, said sequence of test stimuli defining an embedded code representing current test parameters.

* * * * *